US008429058B2

(12) United States Patent
Perry et al.

(10) Patent No.: US 8,429,058 B2
(45) Date of Patent: *Apr. 23, 2013

(54) PAIRED BASIS SWAP RISK AND CREDIT MITIGATION SYSTEM AND COLLATERAL MINIMIZATION SYSTEM

(75) Inventors: J. Scott Perry, New York, NY (US); Wallace C. Turbeville, New York, NY (US); Paul Hamilton, New York, NY (US)

(73) Assignee: VMAC, LLC, New York, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/559,083

(22) Filed: Sep. 14, 2009

(65) Prior Publication Data

US 2009/0327160 A1 Dec. 31, 2009

Related U.S. Application Data

(63) Continuation of application No. 10/764,126, filed on Jan. 23, 2004, now Pat. No. 7,590, 588.

(60) Provisional application No. 60/442,084, filed on Jan. 23, 2003, provisional application No. 60/449,771, filed on Feb. 25, 2003, provisional application No. 60/450,849, filed on Feb. 28, 2003.

(51) Int. Cl.
*G06Q 40/00* (2006.01)

(52) U.S. Cl.
USPC .......................................................... 705/37

(58) Field of Classification Search .............. 705/35–45; 707/705–710, 713, 722, 731
See application file for complete search history.

(56) References Cited

U.S. PATENT DOCUMENTS

2003/0144940 A1* 7/2003 Kochansky et al. ............ 705/36

OTHER PUBLICATIONS

Managing Financial Risk: A Guid to Derivative Products, Financial Engineering, and Value Maximization by Charles W. Smithson, McGraw-Hill, p. 162-176, 303-305, yr 1998.*

* cited by examiner

*Primary Examiner* — Mary Cheung
(74) *Attorney, Agent, or Firm* — McCarthy Fingar; Peter D. Aufrichtig

(57) ABSTRACT

A paired basis swap risk and credit mitigation system and collateral minimization system. In swaps used to hedge forward contracts a system authority interposes itself and forms paired basis swaps with each of the paired swap participants and itself together with a Swaption to allow it to maintain a level book in the event of a default by any counterparty. In the event of a default the system authority has the ability to either terminate a swap and pay the non-defaulting counterparty an agreed upon termination payment, terminate the non-defaulting counterparty's swap and exercise the swaption to substitute a correlated swap with appropriate correlated termination payment; or substitute a new counterparty with an identical swap as the paired swap participant. Paired basis swap control through delivery can be enabled to continue the risk and credit mitigation benefits of the system.

68 Claims, 15 Drawing Sheets

Sample Product Schedule

25 MW Monthly Peak Contract
PJM-West - 16 x 5

| Date | Daily quantity (MWHs) | Remaining Quantity (MWHs) | Notional Quantity (MWHs) |
|---|---|---|---|
| 01-Apr-03 | 400 | 8400 | 8800 |
| 02-Apr-03 | 400 | 8000 | 8400 |
| 03-Apr-03 | 400 | 7600 | 8000 |
| 04-Apr-03 | 400 | 7200 | 7600 |
| 05-Apr-03 | 0 | 7200 | 7200 |
| 06-Apr-03 | 0 | 7200 | 7200 |
| 07-Apr-03 | 400 | 6800 | 7200 |
| 08-Apr-03 | 400 | 6400 | 6800 |
| 09-Apr-03 | 400 | 6000 | 6400 |
| 10-Apr-03 | 400 | 5600 | 6000 |
| 11-Apr-03 | 400 | 5200 | 5600 |
| 12-Apr-03 | 0 | 5200 | 5200 |
| 13-Apr-03 | 0 | 5200 | 5200 |
| 14-Apr-03 | 400 | 4800 | 5200 |
| 15-Apr-03 | 400 | 4400 | 4800 |
| 16-Apr-03 | 400 | 4000 | 4400 |
| 17-Apr-03 | 400 | 3600 | 4000 |
| 18-Apr-03 | 400 | 3200 | 3600 |
| 19-Apr-03 | 0 | 3200 | 3200 |
| 20-Apr-03 | 0 | 3200 | 3200 |
| 21-Apr-03 | 400 | 2800 | 3200 |
| 22-Apr-03 | 400 | 2400 | 2800 |
| 23-Apr-03 | 400 | 2000 | 2400 |
| 24-Apr-03 | 400 | 1600 | 2000 |
| 25-Apr-03 | 400 | 1200 | 1600 |
| 26-Apr-03 | 0 | 1200 | 1200 |
| 27-Apr-03 | 0 | 1200 | 1200 |
| 28-Apr-03 | 400 | 800 | 1200 |
| 29-Apr-03 | 400 | 400 | 800 |
| 30-Apr-03 | 400 | 0 | 400 |

FIG. 6

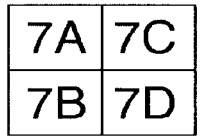

Sample Product Schedule

25 MW Monthly Peak Contract  
PJM-West - 16 x 5

Initial Contract Price  
Contract Value

|  | Date | Daily Quantity (MWHs) | Remaining Quantity (MWHs) | Notional Quantity (MWHs) | Floating Price | Fixed Price |
|---|---|---|---|---|---|---|
| | a | b | c | d | e f | g |
| Saturday | 01-Mar-03 | 0 | 0 | 0 | $0.0000 | $0.0000 |
| Sunday | 02-Mar-03 | 0 | 0 | 0 | $0.0000 | $0.0000 |
| Monday | 03-Mar-03 | 0 | 8800 | 8800 | $36.7500 | $40.0000 |
| Tuesday | 04-Mar-03 | 0 | 8800 | 8800 | $38.1875 | $36.7500 |
| Wednesday | 05-Mar-03 | 0 | 8800 | 8800 | $38.4063 | $38.1875 |
| Thursday | 06-Mar-03 | 0 | 8800 | 8800 | $38.6875 | $38.4063 |
| Friday | 07-Mar-03 | 0 | 8800 | 8800 | $39.0000 | $38.6875 |
| Saturday | 08-Mar-03 | 0 | 8800 | 8800 | $39.0000 | $39.0000 |
| Sunday | 09-Mar-03 | 0 | 8800 | 8800 | $39.0000 | $39.0000 |
| Monday | 10-Mar-03 | 0 | 8800 | 8800 | $40.3750 | $39.0000 |
| Tuesday | 11-Mar-03 | 0 | 8800 | 8800 | $39.7813 | $40.3750 |
| Wednesday | 12-Mar-03 | 0 | 8800 | 8800 | $39.9688 | $39.7813 |
| Thursday | 13-Mar-03 | 0 | 8800 | 8800 | $39.3438 | $39.9688 |
| Friday | 14-Mar-03 | 0 | 8800 | 8800 | $38.5000 | $39.3438 |
| Saturday | 15-Mar-03 | 0 | 8800 | 8800 | $38.5000 | $38.5000 |
| Sunday | 16-Mar-03 | 0 | 8800 | 8800 | $38.5000 | $38.5000 |
| Monday | 17-Mar-03 | 0 | 8800 | 8800 | $43.5000 | $38.5000 |
| Tuesday | 18-Mar-03 | 0 | 8800 | 8800 | $44.2500 | $43.5000 |
| Wednesday | 19-Mar-03 | 0 | 8800 | 8800 | $42.0000 | $44.2500 |
| Thursday | 20-Mar-03 | 0 | 8800 | 8800 | $41.3750 | $42.0000 |
| Friday | 21-Mar-03 | 0 | 8800 | 8800 | $40.8750 | $41.3750 |
| Saturday | 22-Mar-03 | 0 | 8800 | 8800 | $40.8750 | $40.8750 |
| Sunday | 23-Mar-03 | 0 | 8800 | 8800 | $40.8750 | $40.8750 |
| Monday | 24-Mar-03 | 0 | 8800 | 8800 | $40.7500 | $40.8750 |
| Tuesday | 25-Mar-03 | 0 | 8800 | 8800 | $42.7813 | $40.7500 |
| Wednesday | 26-Mar-03 | 0 | 8800 | 8800 | $41.5313 | $42.7813 |

| Day | Date | | | | | |
|---|---|---|---|---|---|---|
| Thursday | 27-Mar-03 | 0 | 8800 | 8800 | $39.6875 | $41.5313 |
| Friday | 28-Mar-03 | 0 | 8800 | 8800 | $39.5938 | $39.6875 |
| Saturday | 29-Mar-03 | 0 | 8800 | 8800 | $39.5938 | $39.5938 |
| Sunday | 30-Mar-03 | 0 | 8800 | 8800 | $39.5938 | $39.5938 |
| Monday | 31-Mar-03 | 0 | 8800 | 8800 | $41.0000 | $39.5938 |
| Tuesday | 01-Apr-03 | 400 | 8400 | 8800 | $40.3125 | $42.8324 |
| Wednesday | 02-Apr-03 | 400 | 8000 | 8400 | $38.8125 | $42.1607 |
| Thursday | 03-Apr-03 | 400 | 7600 | 8000 | $36.7500 | $40.6500 |
| Friday | 04-Apr-03 | 400 | 7200 | 7600 | $38.1875 | $38.7599 |
| Saturday | 05-Apr-03 | 0 | 7200 | 7200 | $38.1875 | $38.1875 |
| Sunday | 06-Apr-03 | 0 | 7200 | 7200 | $38.1875 | $38.1875 |
| Monday | 07-Apr-03 | 400 | 6800 | 7200 | $39.0000 | $40.3542 |
| Tuesday | 08-Apr-03 | 400 | 6400 | 6800 | $40.0000 | $41.3529 |
| Wednesday | 09-Apr-03 | 400 | 6000 | 6400 | $39.9375 | $42.4961 |
| Thursday | 10-Apr-03 | 400 | 5600 | 6000 | $40.3750 | $42.6292 |
| Friday | 11-Apr-03 | 400 | 5200 | 5600 | $39.7813 | $43.2165 |
| Saturday | 12-Apr-03 | 0 | 5200 | 5200 | $39.7813 | $39.7813 |
| Sunday | 13-Apr-03 | 0 | 5200 | 5200 | $39.7813 | $39.7813 |
| Monday | 14-Apr-03 | 400 | 4800 | 5200 | $38.5000 | $42.7428 |
| Tuesday | 15-Apr-03 | 400 | 4400 | 4800 | $37.8438 | $41.6537 |
| Wednesday | 16-Apr-03 | 400 | 4000 | 4400 | $40.3438 | $41.5114 |
| Thursday | 17-Apr-03 | 400 | 3600 | 4000 | $43.5000 | $44.6938 |
| Friday | 18-Apr-03 | 400 | 3200 | 3600 | $44.2500 | $48.4167 |
| Saturday | 19-Apr-03 | 0 | 3200 | 3200 | $44.2500 | $44.2500 |
| Sunday | 20-Apr-03 | 0 | 3200 | 3200 | $44.2500 | $44.2500 |
| Monday | 21-Apr-03 | 400 | 2800 | 3200 | $42.8750 | $49.6094 |
| Tuesday | 22-Apr-03 | 400 | 2400 | 2800 | $44.8750 | $49.2857 |
| Wednesday | 23-Apr-03 | 400 | 2000 | 2400 | $45.3750 | $52.4375 |
| Thursday | 24-Apr-03 | 400 | 1600 | 2000 | $45.7500 | $54.5250 |
| Friday | 25-Apr-03 | 400 | 1200 | 1600 | $45.7813 | $57.1953 |
| Saturday | 26-Apr-03 | 0 | 1200 | 1200 | $45.7813 | $45.7813 |
| Sunday | 27-Apr-03 | 0 | 1200 | 1200 | $45.7813 | $45.7813 |
| Monday | 28-Apr-03 | 400 | 800 | 1200 | $46.5938 | $61.3126 |
| Tuesday | 29-Apr-03 | 400 | 400 | 800 | $45.6875 | $69.4376 |
| Wednesday | 30-Apr-03 | 400 | 0 | 400 | $45.1875 | $90.8750 |

| h | i | j | k | l | m |
|---|---|---|---|---|---|
| $40.00 | | | | | Cash Flows (Seller) |
| $352,000.00 | | | #1 | "-(j + l)" | (j + l) |
| (d * f) | (d * g) | (h + i) | System's | Seller Net | System's Net |
| Floating | Fixed | Seller's MTM | Fee | Obligation | Obligation |
| Amount | Amount | Amount | 0.0375% | to System | to Seller |
| $0.00 | $0.00 | $0.00 | $0.00 | $0.00 | $0.00 |
| $0.00 | $0.00 | $0.00 | $0.00 | $0.00 | $0.00 |
| ($323,400.00) | $352,000.00 | $28,600.00 | ($132.00) | ($28,468.00) | $28,468.00 |
| ($336,050.00) | $323,400.00 | ($12,650.00) | $0.00 | $12,650.00 | ($12,650.00) |
| ($337,975.44) | $336,050.00 | ($1,925.44) | $0.00 | $1,925.44 | ($1,925.44) |
| ($340,450.00) | $337,975.44 | ($2,474.56) | $0.00 | $2,474.56 | ($2,474.56) |
| ($343,200.00) | $340,450.00 | ($2,750.00) | $0.00 | $2,750.00 | ($2,750.00) |
| ($343,200.00) | $343,200.00 | $0.00 | $0.00 | $0.00 | $0.00 |
| ($343,200.00) | $343,200.00 | $0.00 | $0.00 | $0.00 | $0.00 |
| ($355,300.00) | $343,200.00 | ($12,100.00) | $0.00 | $12,100.00 | ($12,100.00) |
| ($350,075.44) | $355,300.00 | $5,224.56 | $0.00 | ($5,224.56) | $5,224.56 |
| ($351,725.44) | $350,075.44 | ($1,650.00) | $0.00 | $1,650.00 | ($1,650.00) |
| ($346,225.44) | $351,725.44 | $5,500.00 | $0.00 | ($5,500.00) | $5,500.00 |
| ($338,800.00) | $346,225.44 | $7,425.44 | $0.00 | ($7,425.44) | $7,425.44 |
| ($338,800.00) | $338,800.00 | $0.00 | $0.00 | $0.00 | $0.00 |
| ($338,800.00) | $338,800.00 | $0.00 | $0.00 | $0.00 | $0.00 |
| ($382,800.00) | $338,800.00 | ($44,000.00) | $0.00 | $44,000.00 | ($44,000.00) |
| ($389,400.00) | $382,800.00 | ($6,600.00) | $0.00 | $6,600.00 | ($6,600.00) |
| ($369,600.00) | $389,400.00 | $19,800.00 | $0.00 | ($19,800.00) | $19,800.00 |
| ($364,100.00) | $369,600.00 | $5,500.00 | $0.00 | ($5,500.00) | $5,500.00 |
| ($359,700.00) | $364,100.00 | $4,400.00 | $0.00 | ($4,400.00) | $4,400.00 |
| ($359,700.00) | $359,700.00 | $0.00 | $0.00 | $0.00 | $0.00 |
| ($359,700.00) | $359,700.00 | $0.00 | $0.00 | $0.00 | $0.00 |
| ($358,600.00) | $359,700.00 | $1,100.00 | $0.00 | ($1,100.00) | $1,100.00 |
| ($376,475.44) | $358,600.00 | ($17,875.44) | $0.00 | $17,875.44 | ($17,875.44) |
| ($365,475.44) | $376,475.44 | $11,000.00 | $0.00 | ($11,000.00) | $11,000.00 |

| | | | | | |
|---|---|---|---|---|---|
| ($349,250.00) | $365,475.44 | $16,225.44 | $0.00 | ($16,225.44) | $16,225.44 |
| ($348,425.44) | $349,250.00 | $824.56 | $0.00 | ($824.56) | $824.56 |
| ($348,425.44) | $348,425.44 | $0.00 | $0.00 | $0.00 | $0.00 |
| ($348,425.44) | $348,425.44 | $0.00 | $0.00 | $0.00 | $0.00 |
| ($360,800.00) | $348,425.44 | ($12,374.56) | $0.00 | $12,374.56 | ($12,374.56) |
| ($354,750.00) | $376,925.00 | $22,175.00 | $0.00 | ($22,175.00) | $22,175.00 |
| ($326,025.00) | $354,150.00 | $28,125.00 | $0.00 | ($28,125.00) | $28,125.00 |
| ($294,000.00) | $325,200.00 | $31,200.00 | $0.00 | ($31,200.00) | $31,200.00 |
| ($290,225.00) | $294,575.00 | $4,350.00 | $0.00 | ($4,350.00) | $4,350.00 |
| ($274,950.00) | $274,950.00 | $0.00 | $0.00 | $0.00 | $0.00 |
| ($274,950.00) | $274,950.00 | $0.00 | $0.00 | $0.00 | $0.00 |
| ($280,800.00) | $290,550.00 | $9,750.00 | $0.00 | ($9,750.00) | $9,750.00 |
| ($272,000.00) | $281,200.00 | $9,200.00 | $0.00 | ($9,200.00) | $9,200.00 |
| ($255,600.00) | $271,975.00 | $16,375.00 | $0.00 | ($16,375.00) | $16,375.00 |
| ($242,250.00) | $255,775.00 | $13,525.00 | $0.00 | ($13,525.00) | $13,525.00 |
| ($222,775.28) | $242,012.52 | $19,237.24 | $0.00 | ($19,237.24) | $19,237.24 |
| ($206,862.76) | $206,862.76 | $0.00 | $0.00 | $0.00 | $0.00 |
| ($206,862.76) | $206,862.76 | $0.00 | $0.00 | $0.00 | $0.00 |
| ($200,200.00) | $222,262.76 | $22,062.76 | $0.00 | ($22,062.76) | $22,062.76 |
| ($181,650.24) | $199,937.52 | $18,287.28 | $0.00 | ($18,287.28) | $18,287.28 |
| ($177,512.72) | $182,650.24 | $5,137.52 | $0.00 | ($5,137.52) | $5,137.52 |
| ($174,000.00) | $178,775.20 | $4,775.20 | $0.00 | ($4,775.20) | $4,775.20 |
| ($159,300.00) | $174,300.00 | $15,000.00 | $0.00 | ($15,000.00) | $15,000.00 |
| ($141,600.00) | $141,600.00 | $0.00 | $0.00 | $0.00 | $0.00 |
| ($141,600.00) | $141,600.00 | $0.00 | $0.00 | $0.00 | $0.00 |
| ($137,200.00) | $158,750.00 | $21,550.00 | $0.00 | ($21,550.00) | $21,550.00 |
| ($125,650.00) | $138,000.00 | $12,350.00 | $0.00 | ($12,350.00) | $12,350.00 |
| ($108,900.00) | $125,850.00 | $16,950.00 | $0.00 | ($16,950.00) | $16,950.00 |
| ($91,500.00) | $109,050.00 | $17,550.00 | $0.00 | ($17,550.00) | $17,550.00 |
| ($73,250.08) | $91,512.52 | $18,262.44 | $0.00 | ($18,262.44) | $18,262.44 |
| ($54,937.56) | $54,937.56 | $0.00 | $0.00 | $0.00 | $0.00 |
| ($54,937.56) | $54,937.56 | $0.00 | $0.00 | $0.00 | $0.00 |
| ($55,912.56) | $73,575.08 | $17,662.52 | $0.00 | ($17,662.52) | $17,662.52 |
| ($36,550.00) | $55,550.04 | $19,000.04 | $0.00 | ($19,000.04) | $19,000.04 |
| ($18,075.00) | $36,350.00 | $18,275.00 | $0.00 | ($18,275.00) | $18,275.00 |
| | | $352,000.00 | ($132.00) | ($351,868.00) | $351,868.00 |
| | | | | ($352,000.00) | $352,000.00 |

FIG. 7D

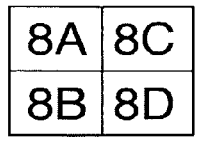

Sample Product Schedule

25 MW Monthly Peak Contract  
PJM-West - 16 x 5

Initial Contract Price  
Contract Value

|  | | a Date | b Daily Quantity (MWHs) | c Remaining Quantity (MWHs) | d Notional Quantity (MWHs) | e | f Floating Price | g Fixed Price |
|---|---|---|---|---|---|---|---|---|
| Saturday | | 01-Mar-03 | 0 | 0 | 0 | | $0.0000 | $0.0000 |
| Sunday | | 02-Mar-03 | 0 | 0 | 0 | | $0.0000 | $0.0000 |
| Monday | | 03-Mar-03 | 0 | 8800 | 8800 | | $36.7500 | $40.0000 |
| Tuesday | | 04-Mar-03 | 0 | 8800 | 8800 | | $38.1875 | $36.7500 |
| Wednesday | | 05-Mar-03 | 0 | 8800 | 8800 | | $38.4063 | $38.1875 |
| Thursday | | 06-Mar-03 | 0 | 8800 | 8800 | | $38.6875 | $38.4063 |
| Friday | | 07-Mar-03 | 0 | 8800 | 8800 | | $39.0000 | $38.6875 |
| Saturday | | 08-Mar-03 | 0 | 8800 | 8800 | | $39.0000 | $39.0000 |
| Sunday | | 09-Mar-03 | 0 | 8800 | 8800 | | $39.0000 | $39.0000 |
| Monday | | 10-Mar-03 | 0 | 8800 | 8800 | | $40.3750 | $39.0000 |
| Tuesday | | 11-Mar-03 | 0 | 8800 | 8800 | | $39.7813 | $40.3750 |
| Wednesday | | 12-Mar-03 | 0 | 8800 | 8800 | | $39.9688 | $39.7813 |
| Thursday | | 13-Mar-03 | 0 | 8800 | 8800 | | $39.3438 | $39.9688 |
| Friday | | 14-Mar-03 | 0 | 8800 | 8800 | | $38.5000 | $39.3438 |
| Saturday | | 15-Mar-03 | 0 | 8800 | 8800 | | $38.5000 | $38.5000 |
| Sunday | | 16-Mar-03 | 0 | 8800 | 8800 | | $38.5000 | $38.5000 |
| Monday | | 17-Mar-03 | 0 | 8800 | 8800 | | $43.5000 | $38.5000 |
| Tuesday | | 18-Mar-03 | 0 | 8800 | 8800 | | $44.2500 | $43.5000 |
| Wednesday | | 19-Mar-03 | 0 | 8800 | 8800 | | $42.0000 | $44.2500 |
| Thursday | | 20-Mar-03 | 0 | 8800 | 8800 | | $41.3750 | $42.0000 |
| Friday | | 21-Mar-03 | 0 | 8800 | 8800 | | $40.8750 | $41.3750 |
| Saturday | | 22-Mar-03 | 0 | 8800 | 8800 | | $40.8750 | $40.8750 |
| Sunday | | 23-Mar-03 | 0 | 8800 | 8800 | | $40.8750 | $40.8750 |
| Monday | | 24-Mar-03 | 0 | 8800 | 8800 | | $40.7500 | $40.8750 |
| Tuesday | | 25-Mar-03 | 0 | 8800 | 8800 | | $42.7813 | $40.7500 |
| Wednesday | | 26-Mar-03 | 0 | 8800 | 8800 | | $41.5313 | $42.7813 |
| Thursday | | 27-Mar-03 | 0 | 8800 | 8800 | | $39.6875 | $41.5313 |

| | | | | | | |
|---|---|---|---|---|---|---|
| Friday | 28-Mar-03 | 0 | 8800 | 8800 | $39.5938 | $39.6875 |
| Saturday | 29-Mar-03 | 0 | 8800 | 8800 | $39.5938 | $39.5938 |
| Sunday | 30-Mar-03 | 0 | 8800 | 8800 | $39.5938 | $39.5938 |
| Monday | 31-Mar-03 | 0 | 8800 | 8800 | $41.0000 | $39.5938 |
| Tuesday | 01-Apr-03 | 400 | 8400 | 8800 | $40.3125 | $42.8324 |
| Wednesday | 02-Apr-03 | 400 | 8000 | 8400 | $38.8125 | $42.1607 |
| Thursday | 03-Apr-03 | 400 | 7600 | 8000 | $36.7500 | $40.6500 |
| Friday | 04-Apr-03 | 400 | 7200 | 7600 | $38.1875 | $38.7599 |
| Saturday | 05-Apr-03 | 0 | 7200 | 7200 | $38.1875 | $38.1875 |
| Sunday | 06-Apr-03 | 0 | 7200 | 7200 | $38.1875 | $38.1875 |
| Monday | 07-Apr-03 | 400 | 6800 | 7200 | $39.0000 | $40.3542 |
| Tuesday | 08-Apr-03 | 400 | 6400 | 6800 | $40.0000 | $41.3529 |
| Wednesday | 09-Apr-03 | 400 | 6000 | 6400 | $39.9375 | $42.4961 |
| Thursday | 10-Apr-03 | 400 | 5600 | 6000 | $40.3750 | $42.6292 |
| Friday | 11-Apr-03 | 400 | 5200 | 5600 | $39.7813 | $43.2165 |
| Saturday | 12-Apr-03 | 0 | 5200 | 5200 | $39.7813 | $39.7813 |
| Sunday | 13-Apr-03 | 0 | 5200 | 5200 | $39.7813 | $39.7813 |
| Monday | 14-Apr-03 | 400 | 4800 | 5200 | $38.5000 | $42.7428 |
| Tuesday | 15-Apr-03 | 400 | 4400 | 4800 | $37.8438 | $41.6537 |
| Wednesday | 16-Apr-03 | 400 | 4000 | 4400 | $40.3438 | $41.5114 |
| Thursday | 17-Apr-03 | 400 | 3600 | 4000 | $43.5000 | $44.6938 |
| Friday | 18-Apr-03 | 400 | 3200 | 3600 | $44.2500 | $48.4167 |
| Saturday | 19-Apr-03 | 0 | 3200 | 3200 | $44.2500 | $44.2500 |
| Sunday | 20-Apr-03 | 0 | 3200 | 3200 | $44.2500 | $44.2500 |
| Monday | 21-Apr-03 | 400 | 2800 | 3200 | $42.8750 | $49.6094 |
| Tuesday | 22-Apr-03 | 400 | 2400 | 2800 | $44.8750 | $49.2857 |
| Wednesday | 23-Apr-03 | 400 | 2000 | 2400 | $45.3750 | $52.4375 |
| Thursday | 24-Apr-03 | 400 | 1600 | 2000 | $45.7500 | $54.5250 |
| Friday | 25-Apr-03 | 400 | 1200 | 1600 | $45.7813 | $57.1953 |
| Saturday | 26-Apr-03 | 0 | 1200 | 1200 | $45.7813 | $45.7813 |
| Sunday | 27-Apr-03 | 0 | 1200 | 1200 | $45.7813 | $45.7813 |
| Monday | 28-Apr-03 | 400 | 800 | 1200 | $46.5938 | $61.3126 |
| Tuesday | 29-Apr-03 | 400 | 400 | 800 | $45.6875 | $69.4376 |
| Wednesday | 30-Apr-03 | 400 | 0 | 400 | $45.1875 | $90.8750 |

| h | i | j | k l | m |
|---|---|---|---|---|
| $40.00 | | | | Cash Flows (Buyer) |
| $352,000.00 | | | #1 | "-(j + l)" (j + l) |
| (d * f) | (d * g) | (h + i) | System's | Buyer Net   System's Net |
| Floating | Fixed | Buyer's MTM | Fee | Obligation   Obligation |
| Amount | Amount | Amount | 0.0375% | to System    to Buyer |
| $0.00 | $0.00 | $0.00 | $0.00 | $0.00 | $0.00 |
| $0.00 | $0.00 | $0.00 | $0.00 | $0.00 | $0.00 |
| $323,400.00 | ($352,000.00) | ($28,600.00) | ($132.00) | $28,732.00 | ($28,732.00) |
| $336,050.00 | ($323,400.00) | $12,650.00 | $0.00 | ($12,650.00) | $12,650.00 |
| $337,975.44 | ($336,050.00) | $1,925.44 | $0.00 | ($1,925.44) | $1,925.44 |
| $340,450.00 | ($337,975.44) | $2,474.56 | $0.00 | ($2,474.56) | $2,474.56 |
| $343,200.00 | ($340,450.00) | $2,750.00 | $0.00 | ($2,750.00) | $2,750.00 |
| $343,200.00 | ($343,200.00) | $0.00 | $0.00 | $0.00 | $0.00 |
| $343,200.00 | ($343,200.00) | $0.00 | $0.00 | $0.00 | $0.00 |
| $355,300.00 | ($343,200.00) | $12,100.00 | $0.00 | ($12,100.00) | $12,100.00 |
| $350,075.44 | ($355,300.00) | ($5,224.56) | $0.00 | $5,224.56 | ($5,224.56) |
| $351,725.44 | ($350,075.44) | $1,650.00 | $0.00 | ($1,650.00) | $1,650.00 |
| $346,225.44 | ($351,725.44) | ($5,500.00) | $0.00 | $5,500.00 | ($5,500.00) |
| $338,800.00 | ($346,225.44) | ($7,425.44) | $0.00 | $7,425.44 | ($7,425.44) |
| $338,800.00 | ($338,800.00) | $0.00 | $0.00 | $0.00 | $0.00 |
| $338,800.00 | ($338,800.00) | $0.00 | $0.00 | $0.00 | $0.00 |
| $382,800.00 | ($338,800.00) | $44,000.00 | $0.00 | ($44,000.00) | $44,000.00 |
| $389,400.00 | ($382,800.00) | $6,600.00 | $0.00 | ($6,600.00) | $6,600.00 |
| $369,600.00 | ($389,400.00) | ($19,800.00) | $0.00 | $19,800.00 | ($19,800.00) |
| $364,100.00 | ($369,600.00) | ($5,500.00) | $0.00 | $5,500.00 | ($5,500.00) |
| $359,700.00 | ($364,100.00) | ($4,400.00) | $0.00 | $4,400.00 | ($4,400.00) |
| $359,700.00 | ($359,700.00) | $0.00 | $0.00 | $0.00 | $0.00 |
| $359,700.00 | ($359,700.00) | $0.00 | $0.00 | $0.00 | $0.00 |
| $358,600.00 | ($359,700.00) | ($1,100.00) | $0.00 | $1,100.00 | ($1,100.00) |
| $376,475.44 | ($358,600.00) | $17,875.44 | $0.00 | ($17,875.44) | $17,875.44 |
| $365,475.44 | ($376,475.44) | ($11,000.00) | $0.00 | $11,000.00 | ($11,000.00) |
| $349,250.00 | ($365,475.44) | ($16,225.44) | $0.00 | $16,225.44 | ($16,225.44) |

| | | | | | |
|---|---|---|---|---|---|
| $348,425.44 | ($349,250.00) | ($824.56) | $0.00 | $824.56 | ($824.56) |
| $348,425.44 | ($348,425.44) | $0.00 | $0.00 | $0.00 | $0.00 |
| $348,425.44 | ($348,425.44) | $0.00 | $0.00 | $0.00 | $0.00 |
| $360,800.00 | ($348,425.44) | $12,374.56 | $0.00 | ($12,374.56) | ($12,374.56) |
| $354,750.00 | ($376,925.00) | ($22,175.00) | $0.00 | $22,175.00 | ($22,175.00) |
| $326,025.00 | ($354,150.00) | ($28,125.00) | $0.00 | $28,125.00 | ($28,125.00) |
| $294,000.00 | ($325,200.00) | ($31,200.00) | $0.00 | $31,200.00 | ($31,200.00) |
| $290,225.00 | ($294,575.00) | ($4,350.00) | $0.00 | $4,350.00 | ($4,350.00) |
| $274,950.00 | ($274,950.00) | $0.00 | $0.00 | $0.00 | $0.00 |
| $274,950.00 | ($274,950.00) | $0.00 | $0.00 | $0.00 | $0.00 |
| $280,800.00 | ($290,550.00) | ($9,750.00) | $0.00 | $9,750.00 | ($9,750.00) |
| $272,000.00 | ($281,200.00) | ($9,200.00) | $0.00 | $9,200.00 | ($9,200.00) |
| $255,600.00 | ($271,975.00) | ($16,375.00) | $0.00 | $16,375.00 | ($16,375.00) |
| $242,250.00 | ($255,775.00) | ($13,525.00) | $0.00 | $13,525.00 | ($13,525.00) |
| $222,775.28 | ($242,012.52) | ($19,237.24) | $0.00 | $19,237.24 | ($19,237.24) |
| $206,862.76 | ($206,862.76) | $0.00 | $0.00 | $0.00 | $0.00 |
| $206,862.76 | ($206,862.76) | $0.00 | $0.00 | $0.00 | $0.00 |
| $200,200.00 | ($222,262.76) | ($22,062.76) | $0.00 | $22,062.76 | ($22,062.76) |
| $181,650.24 | ($199,937.52) | ($18,287.28) | $0.00 | $18,287.28 | ($18,287.28) |
| $177,512.72 | ($182,650.24) | ($5,137.52) | $0.00 | $5,137.52 | ($5,137.52) |
| $174,000.00 | ($178,775.20) | ($4,775.20) | $0.00 | $4,775.20 | ($4,775.20) |
| $159,300.00 | ($174,300.00) | ($15,000.00) | $0.00 | $15,000.00 | ($15,000.00) |
| $141,600.00 | ($141,600.00) | $0.00 | $0.00 | $0.00 | $0.00 |
| $141,600.00 | ($141,600.00) | $0.00 | $0.00 | $0.00 | $0.00 |
| $137,200.00 | ($158,750.00) | ($21,550.00) | $0.00 | $21,550.00 | ($21,550.00) |
| $125,650.00 | ($138,000.00) | ($12,350.00) | $0.00 | $12,350.00 | ($12,350.00) |
| $108,900.00 | ($125,850.00) | ($16,950.00) | $0.00 | $16,950.00 | ($16,950.00) |
| $91,500.00 | ($109,050.00) | ($17,550.00) | $0.00 | $17,550.00 | ($17,550.00) |
| $73,250.08 | ($91,512.52) | ($18,262.44) | $0.00 | $18,262.44 | ($18,262.44) |
| $54,937.56 | ($54,937.56) | $0.00 | $0.00 | $0.00 | $0.00 |
| $54,937.56 | ($54,937.56) | $0.00 | $0.00 | $0.00 | $0.00 |
| $55,912.56 | ($73,575.08) | ($17,662.52) | $0.00 | $17,662.52 | ($17,662.52) |
| $36,550.00 | ($55,550.04) | ($19,000.04) | $0.00 | $19,000.04 | ($19,000.04) |
| $18,075.00 | ($36,350.00) | ($18,275.00) | $0.00 | $18,275.00 | ($18,275.00) |
| | | ($352,000.00) | ($132.00) | $352,132.00 | ($352,132.00) |
| | | | | $352,000.00 | ($352,000.00) |

PAIRED BASIS SWAP RISK AND CREDIT MITIGATION SYSTEM AND COLLATERAL MINIMIZATION SYSTEM

CROSS-REFERENCE TO RELATED APPLICATIONS

This application is a Continuation of U.S. patent application Ser. No. 10/764,126, filed Jan. 23, 2004, now U.S. Pat. No. 7,590,588 the entire contents of which are incorporated herein by reference, and which claims the benefit of U.S. Provisional Patent Application No. 60/442,084, filed on Jan. 23, 2003; U.S. Provisional Patent Application No. 60/449,771, filed on Feb. 25, 2003; and U.S. Provisional Patent Application No. 60/450,849, filed on Feb. 28, 2003.

FEDERALLY SPONSORED RESEARCH

None

SEQUENCE LISTING

None

BACKGROUND OF THE INVENTION

The invention is generally directed to a system for mitigating the credit risk associated with a paired swap and in minimizing the collateral requirements of swap counterparties. The invention is generally directed to the area of commodity trading, in which parties enter into forward contracts for delivery or sale of goods at some time in the future, and hedge these forward contracts with commodity swaps. Parties enter into commodity swaps for various reasons, including hedging supply or demand, speculation, leveling of costs or markets for future production or purchases and other specialized reasons. However, major participants in the commodities market tend to assure that the counterparty with whom they are dealing will be able to either pay for or deliver the performance required under the forward contract when due. Failure of a counterparty to a forward contract to perform eviscerates the value of the forward contract for any of its purposes. Accordingly, there is a need for a system that can be used by counterparties to forward contracts to mitigate the risk of market losses in the event of credit defaults by counterparties.

Generally, market participants who act as counterparties to forward contracts have or try to obtain protection or insurance securing the performance of their counterparties.

There is a paired commodity swap credit risk mitigation system in which a central swap counterparty, known as the "Swap Entity", enters into offsetting swaps with equivalent terms, with two swap counterparties simultaneously, thereby replacing the credit of the individual swap counterparties with the credit of the Swap Entity for amounts related to settlement payments and termination payments. Generally, if the Swap Entity is to maintain high credit quality, it must be structured such that it can balance its book in the event of default of one of the paired swap counterparties. Generally, a counterparty must collateralize its participation in the paired swap arrangement for each transaction so that the Swap Entity will have sufficient funds to balance its book in the event of default by such counterparty at any point. However, counterparties may, over time, enter into additional swap transactions in which there is a cancelling swap. Accordingly, there is a need for an improved method and system for minimizing the collateral required from participants in a paired swap credit mitigation system.

There is also a need for an improved method and system of updating and minimizing the collateral required from a participant in the paired swap credit mitigation system and procedures to enable the Swap Entity to maintain a balanced book of swaps with the various swap counterparties while enhancing the swap counterparty's possibility of receiving desired performance, either through settlement payments, termination payments or performance.

In addition, many of the paired swap contracts are designed to hedge forward contracts for performance over a period of time, such as in power contracts or natural gas contracts, where anticipated performance extends over a period of weeks or a month. Generally, once the forward contract is activated into a physical contract for delivery of the commodity, the substantial financial risks associated with performance are historically unsecured and large exposures are available to either party in the event of a financial or performance default by one of the counterparties. Accordingly, there is a need to provide a system for transferring the risk of performance and payments under a physical contract during delivery and to assure that payments are made on an ongoing basis and security is maintained so that exposure of the parties to default by the other party is reduced commensurate with performance.

SUMMARY OF THE INVENTION

The invention is generally directed to a system that can be used by counterparties to forward contracts to mitigate the risk of market losses in the event of credit default by counterparties. The System is premised upon a paired commodity swap concept whereby participants to forward contracts enter into equal and off-setting commodity swaps with a Swap Entity as a counterparty. The System is designed so that it will always maintain a flat book with respect to commodity swap positions and will have rights to terminate positions in order to re-balance its book. The commodity swap will based upon the difference between the fixed contract price of the underlying commodity and the floating index price related to the underlying commodity. Settlement will occur daily under the commodities swap and participants will be required to post collateral to the System based upon the System's calculation of the risk of balancing its book in the event of an early termination due to default. To the extent participants have off-setting commodity swaps with the System, that is, both long and the short commodities swaps related to either identical or correlated reference products, participants will only be required to post net collateral to the System. As a result, participants will be able to reduce the total collateral requirements.

The invention is also directed to a system of minimizing the collateral required from a participant in a paired swap credit mitigation system. Under such a credit mitigation system, a central swap counterparty ("Swap Entity" or "Central Swap Authority") enters into off-setting swaps with equivalent terms with two swap counterparties simultaneously, thereby replacing the credit of the individual swap counterparties with the credit of the Swap Entity for amounts related to settlement payments and termination payments.

The invention is also generally directed to a system for activities to be taken upon default so as to optimize the use of collateral. Under this System each participating party to a swap has a paired swap participant identified by the System. If a participant defaults on a swap, three scenarios are dealt with: 1) the System has the option to terminate the swap of a non-defaulting swap participant and pay the non-defaulting swap participant a pre-determined Termination Payment; 2)

the System has the option to call the swap of the non-defaulting swap participant and exercise the Swaption, either with the same or a correlated commodity reference index, in which case, the non-defaulting counterparty would receive a correlated Termination Payment to compensate for the change in basis risk due to the change in reference index; or 3) the System can re-pair the paired swap participant with a new paired swap participant.

The invention is also directed to a system for daily settlement of physical contracts during performance, in which the swap reference index is adjusted on a daily basis as to performance remaining and contract price payments due and the funds are automatically debited through the System to the party entitled to receive payment, based upon the notional quantity to be delivered so that processing of payments and performance is simplified for the counterparties, while reducing their risk and only requiring final reconciliation upon completion of the contract.

Accordingly, it is an object of the invention to provide an improved paired basis swap risk mitigation system.

Another object of the invention to provide an improved paired commodity swap credit mitigation system.

Yet a further object of the invention to provide an improved method and system for minimizing collateral requirements of swap counterparties.

Still another object of the invention is to provide an improved system for providing a central swap counterparty for counterparties to swap contacts, which mitigates the risk of market losses in the event of credit defaults by counterparties and allows the System to manage the swap contracts through the issuance of paired swap contracts, in which each counterparty deals directly with the System, rather than with another counterparty, and the System has the ability to eliminate the risk of an unbalanced book caused by the default of a swap counterparty by terminating, calling, exercising Swaptions and paying termination payments or correlated contract termination payments, while substituting a correlated contract for the called contract; thereby providing enhanced reliability of counterparty performance, or payments to the counterparties while assuring that the System maintains a flat book of paired swaps, such that the System always has any open contracts paired with equal and off-setting swaps with equivalent terms with two swap counterparties simultaneously.

Yet still a further object of the invention to provide a improved swap counterparty system in which a swap contract covered under the swap counterparty system is converted to a performing contract under the System whereby performance financially and by delivery are updated on a daily basis with financial payments handled through the System so that, in the absence of default in performance or payment, payment is automatically made on a daily basis in accordance with the notional delivery under the swap contract, whereby a default would create credit exposure limited to, at most, one day's notional quantities.

Still other objects and advantages of the invention will, in part, be obvious and will, in part, be apparent from the specification.

The invention accordingly comprises the features of construction, combinations of elements, arrangements of parts, steps, procedures and methods of operation which will be exemplified in the constructions and processes as hereinafter set forth, and the scope of the invention will be indicated in the Claims.

BRIEF DESCRIPTION OF THE DRAWINGS

For a fuller understanding of the invention, reference is had to the following descriptions taken in connection with the accompanying drawings, in which:

FIG. 6 is a chart of a product schedule in connection with a contract for commodities;

FIG. 7 is a table showing the cash flows of the Seller in connection with the performance of a physicals contract controlled by the System of the invention;

FIG. 8 is a table similar to that of FIG. 7 for the Buyer's cash flows in the same transaction;

DETAILED DESCRIPTION OF THE PREFERRED EMBODIMENTS

Figure 1:
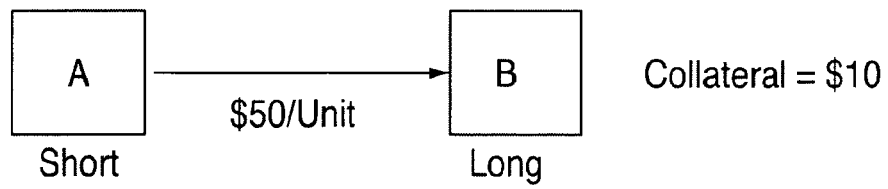
FIG. 1 is a block diagram of a two party futures trade in accordance with the prior art.

The invention is generally directed to a system which is useful for counterparties to forward contracts to mitigate the risk of market losses in the event of credit defaults by counterparties. The System is premised upon a paired commodity swap concept, whereby participants to forward contracts enter into equal and off-setting commodity swaps with the System as a counterparty. The System is designed so that it will always maintain a flat book with respect to commodity swap positions and will have rights to terminate positions in order to re-balance its book. The commodity swaps will be based upon the difference between the fixed contract price of the underlying commodity and the floating index price related to the underlying commodity. Settlement will occur daily under the commodity swap and participants will be required to post collateral to the System based upon the System's calculation of the risk of balancing its book in the event of an early termination due to default. To the extent participants have off-setting commodity swaps with the System, i.e., both the long and short commodity swap related to either identical or correlated reference products, participants will only be required to post net collateral to the System. As a result, participants will be able to reduce the total collateral requirements significantly, as compared to a system in which each commodity swap is handled separately without netting.

The System commodities swaps will have terms designed to match the terms submitted to the System in respect of the underlying forward contracts. The notional quantities of the swaps will roll off during delivery to mirror any delivery schedules associated with the forward contracts. It should be noted that the System is not concerned with either the validity or enforceability of the underlying contracts, nor is the System concerned with any alteration of the terms or early termination of the underlying contracts by the parties.

Upon entering into a commodity swap, participants will agree to make and receive fixed versus floating payments to and from the System, based upon an agreed contract price (as adjusted as described below, the "Fixed Rate") and a floating index price (the "Floating Rate"). A participant identified as a Seller of an underlying contract will pay the Floating Rate and receive the Fixed Rate. A participant identified as a Buyer of an underlying contract will pay the Fixed Rate and receive the Floating Rate. The Fixed Rate will be re-set periodically to equal the prior period's Floating Rate. A commodity swap may be terminated by the System, either upon the occurrence of a Termination Event, or upon the exercise by the System of its Option to Terminate. Termination Events include, without limitation: bankruptcy of a participant; a participant's failure to make a daily cash settlement payment; and a participants failure to post collateral to secure the System's net exposure in respect of the net termination payment as required. A commodity swap may be terminated by a participant upon the exercise by the participant of its Option to Terminate.

Upon the termination of a commodity swap by the System based upon a Termination Event, the participant will be required to pay to the System a "Net Termination Payment" which payment will be made from the immediate liquidation of collateral held by the System. The Termination Payment is based upon an agreed algorithm specific to each product and duration that is established by the System from time to time and shall be effective upon notification to participants. The specific algorithm utilized to calculate the Termination Payment is not critical to the functioning of the System. Rather, it is important that all participants agree that the Termination Payment as calculated by a formula or algorithm or by reference to some outside schedule or service is the way in which the Termination Payment is set. The Net Termination Payment is the sum of Termination Payments, reduced in respect of any Correlated Positions (as described below), plus any accrued and unpaid Daily Cash Settlement Payments owed by the participants to the System.

If the System exercises its Option to Terminate any commodity swap, the System will be required to either make a Termination Payment to the participant or exercise the related Swaption (as described below) and, if the notional product in the new commodity swap issued pursuant to the Swaption (the "New Commodity Swap") is a correlated product, rather than the same notional product, then what is paid to the terminated participant, is the correlation amount (as defined below). If the participant exercises its Option to Terminate any commodity swap, the participant will be required to make a Termination Payment to the System. If the exercise is made jointly with the exercise by another participant of its Option to Terminate an identical commodity swap, then neither party exercising such options will be required to pay a Termination Payment. This flows from the requirement that the System maintain a balanced book.

The Net Termination Payment will be determined using termination payment algorithms described above and price correlations. Price correlations will measure the amount by which individual commodity swap positions reduce the System's exposure to a participant in respect of other commodity swap positions. Correlation matrices identifying correlated products will be published by the System from time to time and shall become effective and binding upon notification to the participants. Generally speaking, correlated products are products which are the same or very similar, but may have delivery terms at geographically distinct areas where there are known variations in cost between the two delivery locations. Similarly, the correlated products can relate to products for delivery at the same location, but with slightly different specifications. The "Correlation Amount" with respect to two Correlated Products will be a sum of the Termination Amounts then applicable to each of the Correlated Products multiplied by a factor equal to one minus the related price correlation. The System may change the correlations as a result of changed circumstances or as a result of changes in historical market data. However, these changes would not go into effect until notification to the participants is provided. So long as the correlation matrices are fixed within the System, the System will maintain appropriate collateral from each of the parties so that, upon a termination, appropriate collateral will be on hand to make the required Termination Payment or Termination Correlation Payments.

At the time each commodity swap is entered into, the System and the participant will also enter into a Swaption exercisable by the System at the time it exercises its Option to Terminate the related commodity swap. The Swaption will constitute an option on the part of the System to enter into a New Commodity Swap with the terminated participant, provided that the System has exercised such Option to Terminate. Upon the exercise of a Swaption, the System will designate a Paired Swap Party to the terminated participant with respect to each New Commodity Swap. The term "Paired Swap Party" means the participant identified by the System as having a commodity swap position with the System that directly off-sets the New Commodity Swap position a terminated participant has as a result of the System's exercise of its Swaption.

The New Commodity Swaps entered into by the terminated participant will have, in addition to the terms otherwise applicable to commodity swaps as described above, the following terms: 1) the notional product will be a Correlated Product with respect to the notional product in the Terminated Commodity Swap; 2) the initial Fixed Index amount will be the Floating Index price applicable to the notional product on the day prior to the exercise of the Swaption; and 3) the fixed and floating payors will be the same as in the Terminated Commodity Swap.

Participants in the paired commodity swap system will be required to maintain on deposit collateral at all times equal to or in excess of the amount of the Net Termination Payment payable to the System. The collateral amount will be based upon factors pertaining to movements in the Floating Price and is designed to reflect liquidity, volatility, seasonality, mean reversion, duration and price of the underlying forward contract. The System collateral amount will be calculated daily with the requirements for collateral on hand, similarly, due on a daily basis.

To the extent that participants have multiple commodity swaps with the System based upon identical and off-setting underlying contracts (e.g., long and short underlying contracts for August 2003 PJM power), participants can have their collateral requirements reduced by the amount of the off-set. For example, a participant who has both bought and sold 50 MW of PJM August 2003 power and has submitted data related to both contracts to the System, then the participant will have two off-setting commodity swaps and will not be required to post any collateral on the two equally off-setting contracts.

In addition to collateral reductions based upon identical underlying contracts, participants may also have their collateral requirement reduced by off-setting correlated swaps. To the extent underlying contracts are correlated, a participant will have its collateral requirement reduced by the correlation.

In order to provide the maximum hedge value to participants, the System will propose contracting terms that participants should, but are not required to, agree to insert into their bilateral forward contracts. The system has no control over whether participants agree to abide by or incorporate the contracting rules. Any implementation of these suggested contract terms is by and among the participants solely and does not pertain to the System or the System's Credit Risk Mitigation Program. The contract terms the System recommends participants include in their underlying forward contacts include:
1. Price: The price term of all contracts hedged through the System's commodity swaps shall be, as of any date of calculation, the applicable Floating Rate amount.
2. Collateral: There shall be no collateral required by either counterparty for so long as the System's commodity swap hedge shall be in effect.
3. Default: If the System's commodity swap that is entered into as a hedge in respect of any contract shall be terminated in accordance with the terms thereof, such contract shall be deemed to be in default and subject to termination.
4. Hedges: Neither party shall exercise its Option to Terminate a commodity swap that is used to hedge a bilateral position unless it does so with the written approval of the other party.
5. Replacement Positions: If the System shall terminate the commodity swap that is entered into as a hedge of any contract it shall, in lieu of making a Termination Payment, exercise its rights under the Swaption associated with such commodity swap. The party to such Swaption shall enter into a replacement forward contract with the counterparty of the defaulting party that is identified by the System as the balancing counterparty. This undertaking is made by each party for the benefit of the other party for the benefit of the counterparties of such other party. The replacement forward contract shall be entered into under the applicable bilateral master agreement between the parties to such replacement forward contract or, if no such bilateral master agreement exists under the EEI Standard form, for electricity, or the NAESB Standard form for natural gas, or other industry standard forms for other applicable commodities.

Reference is made to FIG. 1, wherein the relationship between the parties prior to entering into a system commodity swap, including the posting of collateral from party A to party B to secure party B's $50 exposure to A. The example of FIG. 1 is what might be called an AB Forward Contract, with a product X, having a price of $50 per unit. A would traditionally have to post a collateral equal to $10 to party B per unit to secure performance. This is the traditional approach to counterparties entering into a forward contract and, obviously, includes risks of many sorts.

Figure 2:
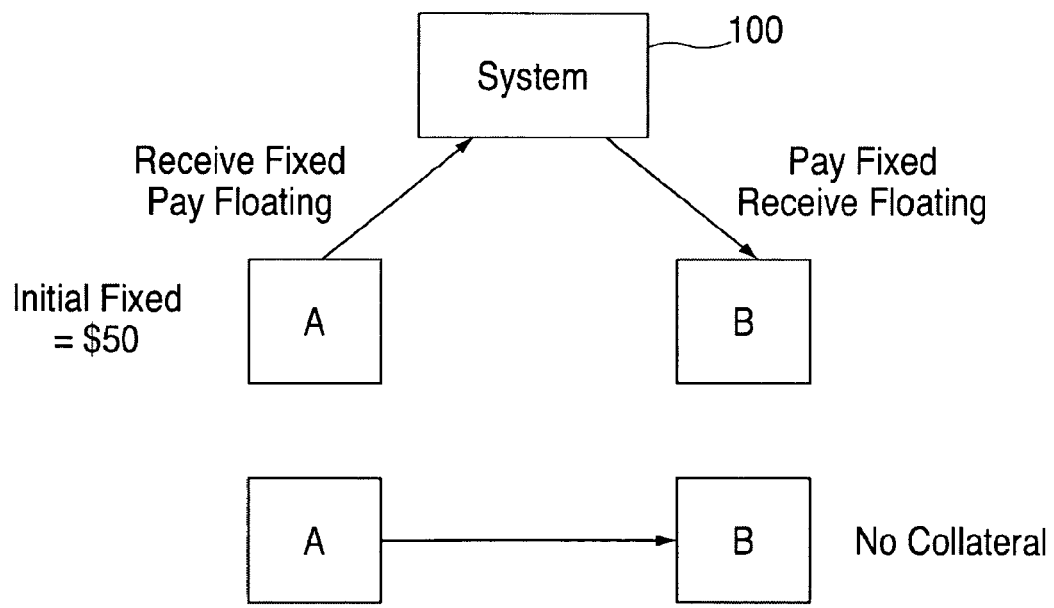
FIG. 2 is a block diagram of a paired commodity swap in accordance with a first preferred embodiment of the invention.

Reference is next made to FIG. 2, which illustrates the relationship between the parties A and B after entering the forward contract data to the System and entering into a system commodity swap. Note that party A normally would be required to post $10 of collateral to party B under the AB forward contract as shown in FIG. 1. However, upon entering into the System's paired commodity swaps, parties A and B would agree that no collateral would be due the other under the AB forward contract. As shown in FIG. 2, party A would receive the Fixed Rate, which means as of any date, the contract price applicable as of the date the commodity swap is entered into and is adjusted from time to time, to equal the prior day's Floating Rate under the commodities swap. Party A would also pay the Floating Rate, which means the most recent forward price index applicable to the product and duration. Similarly, party B would pay the Fixed Rate and receive the Floating Rate. In addition, party A would receive the index price calculated on the date of delivery for power delivered. This price, plus the effect of the System swaps, would equal $50 per unit.

Figure 3:
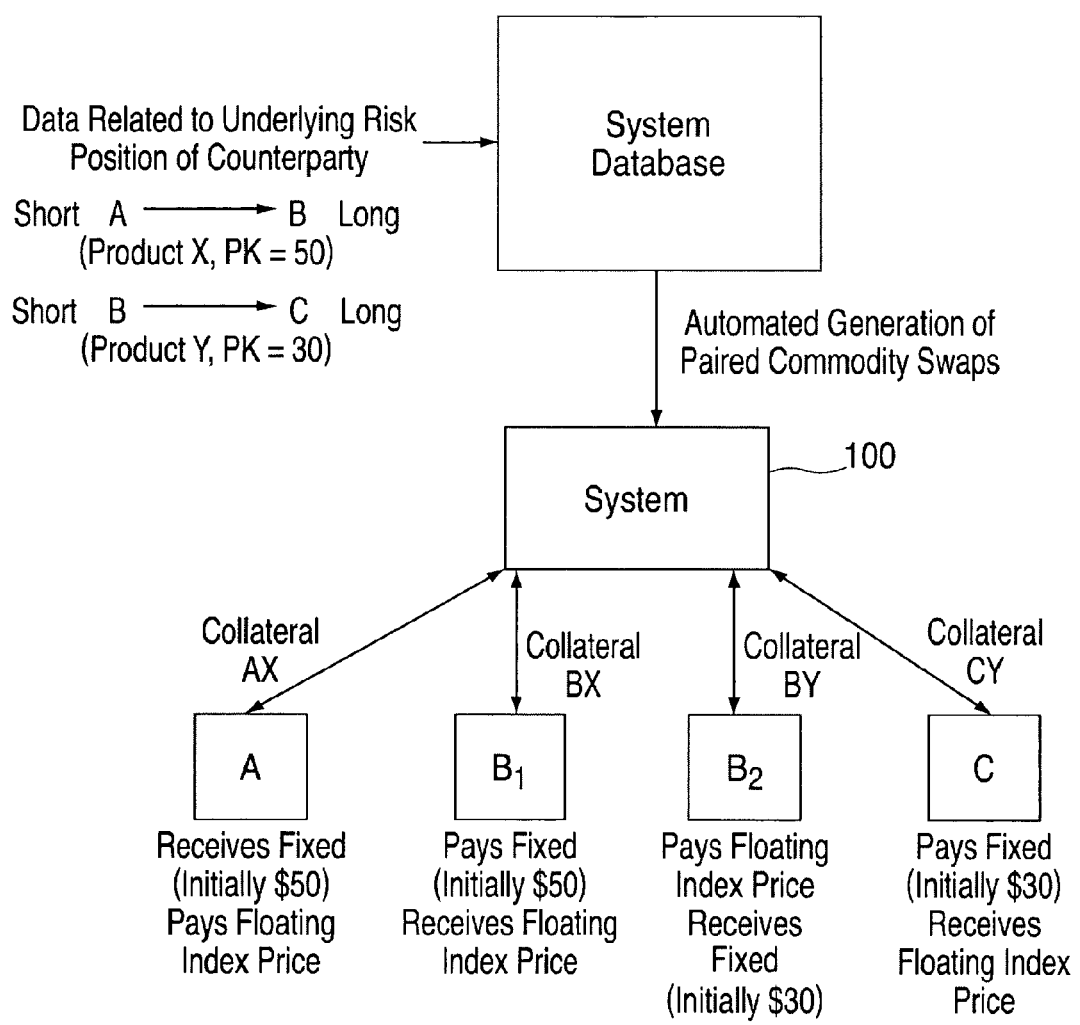
FIG. 3 is a block diagram of a paired basis swap system in accordance with a preferred embodiment of the invention.

Reference is next made to FIG. 3, wherein the benefits of netting afforded participants upon entering into multiple system commodity swaps, as well as the information flows necessary to enter into the System the paired commodity swaps are shown. FIG. 3 shows the System 100 with two forward contracts shown, one a contract on product X between parties A and B, and another on product Y between parties B and C. The first forward contract is one in which party A is in the short position and party B is in the long position, covering product X, having a contract price of $50. The second forward contract is between parties B and C, where party B has the short position and party C has the long position on a product Y, where the price of the contract PK is equal to $30. When this information is input into system database 110, the System 100 automatically generates paired commodity swaps so that four commodity swaps are generated. These are identified as swaps A, $B_1$, $B_2$ and C. As is always the case, all swaps are entered into between a counterparty and the System. The System 100 holds collateral against the default of any of the parties in amounts equal to $Collateral_{AX}$, $Collateral_{BX}$, $Collateral_{BY}$ and $Collateral_{CY}$. These amounts are calculated periodically and represent risk associated with the replacement of the commodity swap by the System should a counterparty default. Generally, in a current preferred embodiment, the collateral amounts are recalculated at least daily. The amount of the collateral represents risk associated with the replacement of the commodity swapped by the System, should a counterparty default.

If X and Y are uncorrelated positions, then B's net collateral position with respect to the System, would be the $Collateral_{BX}$ plus the $Collateral_{BY}$. However, if X and Y are correlated positions, then B's net collateral reflects the net exposure the System would have in cancelling swaps $B_1$ and $B_2$. The System has the right to cancel any of the commodities swaps with the counterparties during the term of the swap, by making a Termination Payment to the counterparty which will vary during the life of the swap, based upon predetermined algorithms. The algorithms themselves are not critical to the operation of the System as required. However, it is, as noted above, critical that all participants to the commodity swap system agree to be governed by the Termination Payments established by the System. The System also has an option to terminate a commodities swap by exercising a Swaption, which would create a new commodity swap between the System and the terminated participant based upon a correlated product. For example, if party A defaults to the System, the System would set-off the Termination Payment owed by A against the $Collateral_{AX}$. Subsequently, the System would make a Termination Payment to party B to cancel the swap system, $B_1$ in order to balance its book. The collateral requirements and Termination Payments are established in the fashion that the System will always have enough collateral from the defaulting party to make the required Termination Payment to the non-defaulting party.

If party B were to default to the System 100, then more possibilities are present, than where only a single swap exists by a counterparty (as exemplified by party A described above). If the two swaps shown for party B with respect to products X and Y are uncorrelated, then the System would seize the net collateral of party B and make Termination Payments to parties A and C to cancel the System-A and system-C swaps in order to balance its book. However, if the X and Y products are correlated, then the System would seize the net collateral of party B (as above) and exercise its Swaption for parties A or C in connection with the counterparty swaps. Then, participant A or C would have a new commodity swap for a correlated product. If party A terminates the correlated commodity swap after the System exercises its Swaption, then party A is required to make a Termination Payment to the System and the System would then terminate the commodity swap it has with party C by making a Termination Payment to party C. If party C terminates after the System exercises its Swaption, party C is required to make a Termination Payment to the System and the System would then terminate the commodity swap it has with party A by making a Termination Payment to party A. In all of these cases, the System's book remains balanced and the payments flowing through the System are established in accordance with the algorithms and pricing set so as to assure that the System will always have sufficient collateral to make any required payments, without the need to obtain further collateral from any counterparty.

Generally speaking, when a counterparty enters into a forward contract there are three scenarios with a swap where there is a default and a decision has to be made in connection with the swap. In the first, the swap has a paired swap participant as in FIG. 2, where Counterparty A has a swap with the System and Counterparty B, known as the paired swap participant (the "PSP") defaults. The action that will be taken by the System if the PSP defaults will depend upon what B's book looks like. If the swap that we are looking at is the only swap that the PSP has, then the System will terminate the swap with Counterparty A to even the System's book. Terminating the swap with A results in the System's paying the non-defaulting swap participant the Termination Payment. The System will have funding sufficient to pay this from the collateral of B. The second scenario is one in which B's book includes a correlated contract, such as is shown in FIG. 3. In this case there is a paired swap for commodity X between Counterparty A and the System and a second swap between the System and Counterparty B (the defaulting party). Next, there is a swap between Counterparty B and the System for commodity Y with a paired swap between the System and Counterparty C for commodity Y. When Counterparty B defaults, all of its swaps with the System are terminated. Because contracts on commodities X and Y are correlated contracts, the System is authorized to substitute performance to Counterparty A a swap contract with the System on correlated commodity Y. In practice, the System terminates the System-to-B swap on commodities X and Y, calls the A-to-system swap on commodity X, exercising the Swaption for commodity Y and making a Correlated Termination Payment to A. The effect of this is that Counterparty A moves from a swap contract with the System for commodity X to one with commodity Y, which is a correlated contract, based upon the use of the termination and Swaption procedures available in the System, and this swap becomes a paired swap to the existing swap on commodity Y between the System and Counterparty C. The third scenario is a re-pairing of paired swap participants. In this scenario, Counterparty B, the defaulting PSP, has two swap contracts with the System for the same commodity X, one of which has Counterparty B in a long position, and the other has Counterparty B in a short position. One of these paired swaps is with Counterparty A and the other is, through the System, with Counterparty C. In this situation, when Counterparty B defaults, the System cancels both of the paired basis swaps between the System and Counterparty B. Because these two contracts are paired and equal in value but opposite in position, no collateral is required or associated for Counterparty B. The System then rematches the swap, one between Counterparty A and the System for commodity X with the swap between the System and Counterparty C, the new PSP for Counterparty A.

Generally, the System will not have any liability or losses associated with its operation because it maintains a level book when new forward contracts are entered into the System and upon any default. By following the three scenarios described above, the System is able to maintain a level book at all times. The various termination and correlated Termination Payments are established in values agreed to by all counterparties prior to entry into the System. Generally, formulas are developed to calculate appropriate termination and correlated termination values based upon evaluation of anticipated values and exposures. However, while there may be situations in which a counterparty is not made whole by the Termination and correlation Termination Payments, the formulas and algorithms used to develop these payments are agreed upon by all parties. These Termination Payments are generally established so as to make a counterparty whole as of the position existing, at most one-day prior to the default. This scenario is functional because collateral requirements are updated on a daily basis and payments are based upon the values in place on the previous day. Looking at the situation from a time-based system, if there is default on day T, that means that appropriate collateral was placed by the defaulting party on day T−1. Thus, if the System pays out based upon values in effect on day T−1 for a default on day T, appropriate collateral to make all required Termination and correlation Termination Payments will be in hand. Generally, the System will assure the participants of its ability to pay out all required payments through a policy of insurance, which does not secure the System's ability to locate or supply funds for the collateral, but rather as to the security of the collateral posted by each of the counterparties to the System.

Figure 10:
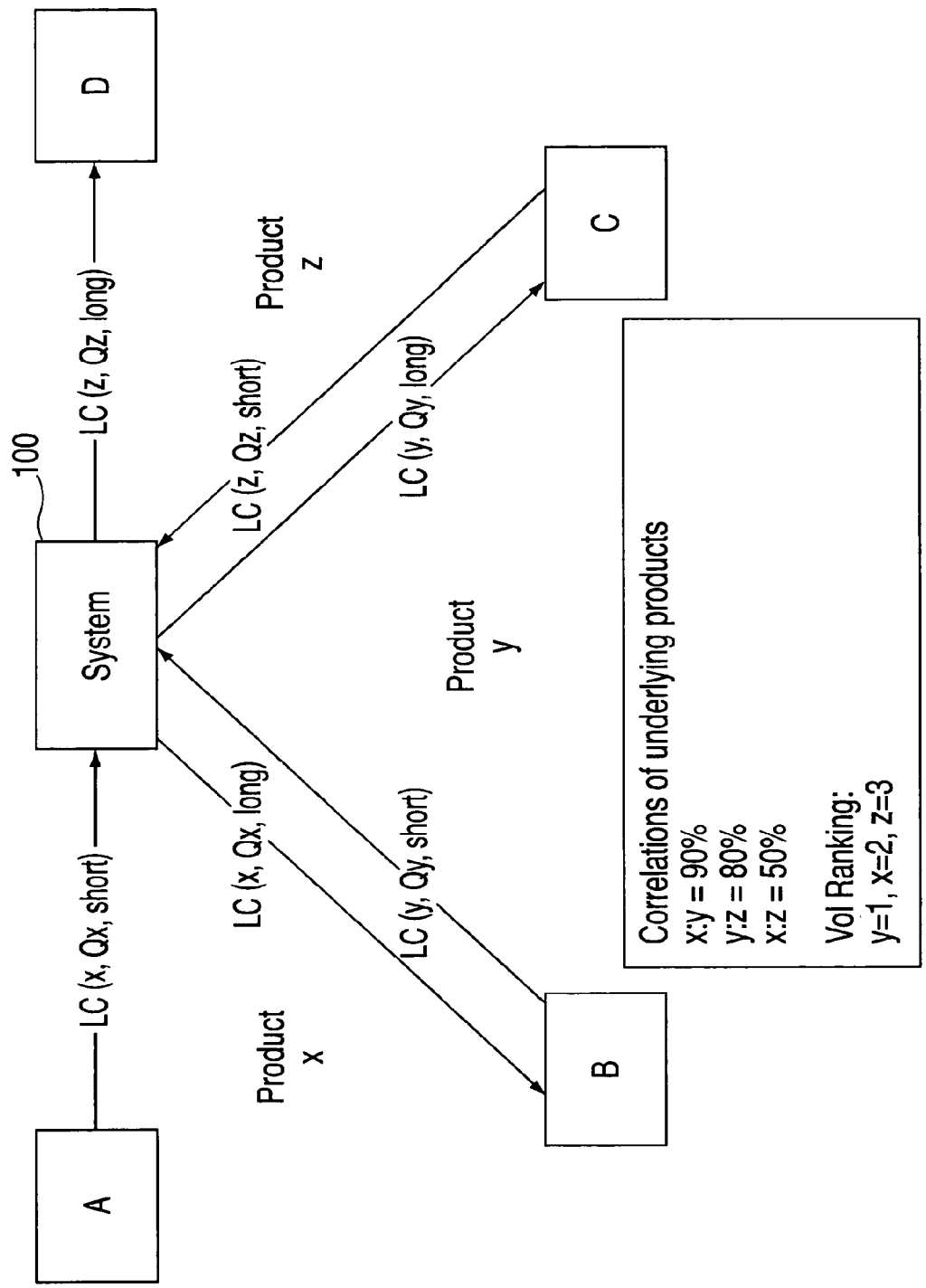
FIG. 10 is a block diagram showing a series of paired basis swaps with correlations to each other.

Reference is next made to FIG. 10, in which an alternate analysis of the way in which the System operates in accordance with the invention is shown. In FIG. 10, four counterparties, A, B, C and D, are shown, each of which has the paired basis swaps with the System 100. As noted in the box at the bottom of FIG. 10, the correlations of the underlying products are shown with the correlation between products X and Y being 90%, the highest of the three correlations and the volatility ranking of the three products with Y the lowest volatility, X the middle volatility at 2, and Z the highest volatility set at 3. Generally speaking, when the System notes the default of Counterparty B, it must decide which legs to call. Generally, the first step is to call the most volatile swap leg. The intent is to prevent a counterparty from being handed a contract which has no correlation or little correlation and which could result in a collateral call on the terminated counterparty. As shown in FIG. 10, if B defaults, the A swap for product X is called, and is replaced with the Y swap. The rule is not to call the contract with the highest value at risk ("VAR"), as it is theoretically possible for a leg with lower volatility to have a higher VAR. The diagram of FIG. 10 bespeaks a hub-and-spoke relationship, that is, the hub will have the lowest volatility and the spokes will be higher in differing amounts. The parties should be handed a hub or a spoke, but should not cross from one hub-spoke arrangement to another hub-spoke arrangement. The products should be ranked in a record field so that, in any correlated pair, the higher number is called, that is the record field for Y would be 1; for X it would be 2 and for Z it could be 3. Then for any correlated pair of swaps, the System would call the swap with the higher volatility ranking and execute a Swaption with the underlying commodity designated the same as that of the initial paired swap with the lower volatility ranking.

Another element of the invention is a method by which the System minimizes the collateral required from a participant in a paired swap mitigation system. Under such a credit mitigation system, a central swap counterparty, referred to above as "the System" or as a Swap Entity enters into off-setting swaps with equivalent terms to swap counterparties simultaneously, thereby replacing the credit of individual credit counterparties with the credit of the Swap Entity for amounts related to Settlement Payments and Termination Payments.

Figure 4:
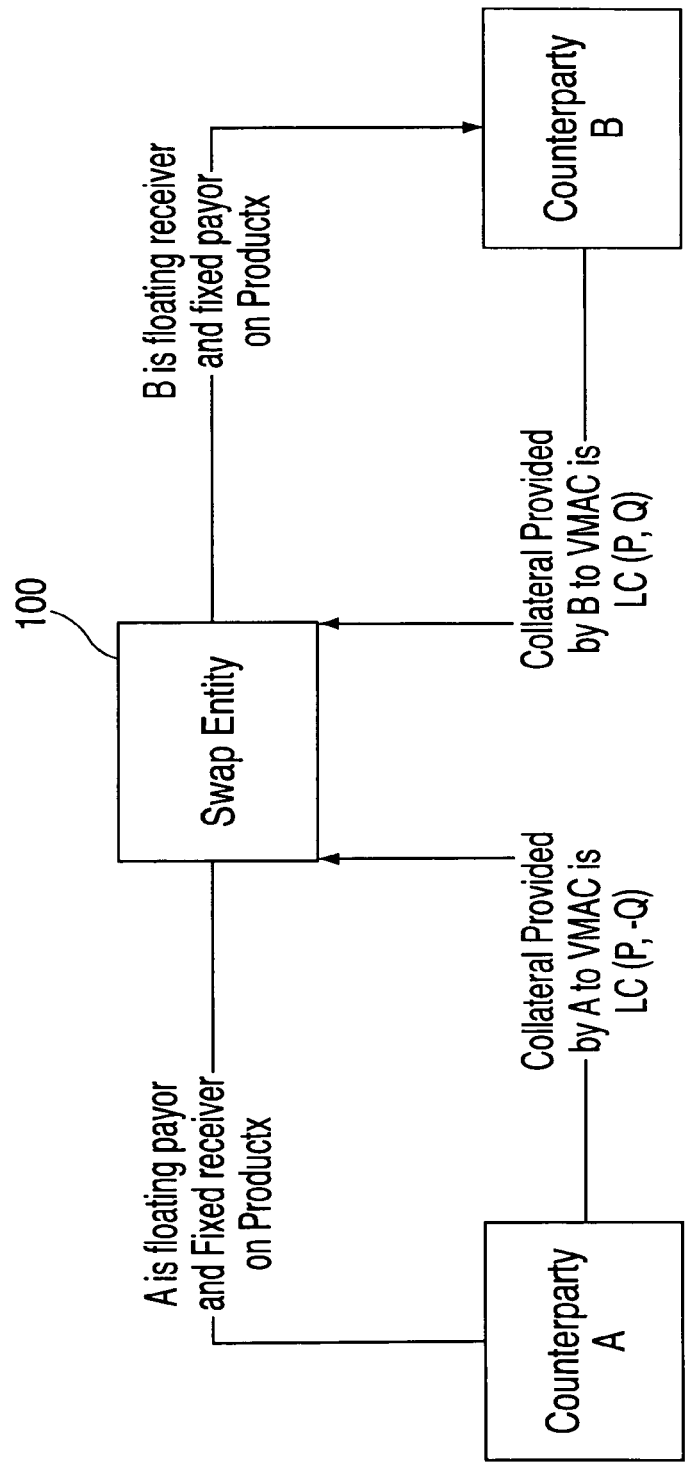
FIG. 4 is a block diagram of another paired basis swap in accordance with the invention.

Reference is next made to FIG. 4, wherein the outlines of the role of the Swap Entity as a central swap counterparty 100 is depicted. As shown, Counterparty A has a swap with Swap Entity 100 and Swap Entity 100 has an offsetting swap with equivalent terms with Counterparty B. As shown in FIG. 4, Counterparty A is a Floating Rate payor and a Fixed Rate receiver on product X. In addition, the collateral required to be provided by Counterparty A to Swap Entity 100 is the value at risk (VAR) of its short position LC(P,−Q). Similarly, Counterparty B, in connection with its swap on commodity X with Swap Entity 100 is a Floating Rate receiver and a Fixed Rate payor on product X. The collateral required to be provided by Counterparty B to the System is the VAR of long position LC(P,Q).

Figure 5:
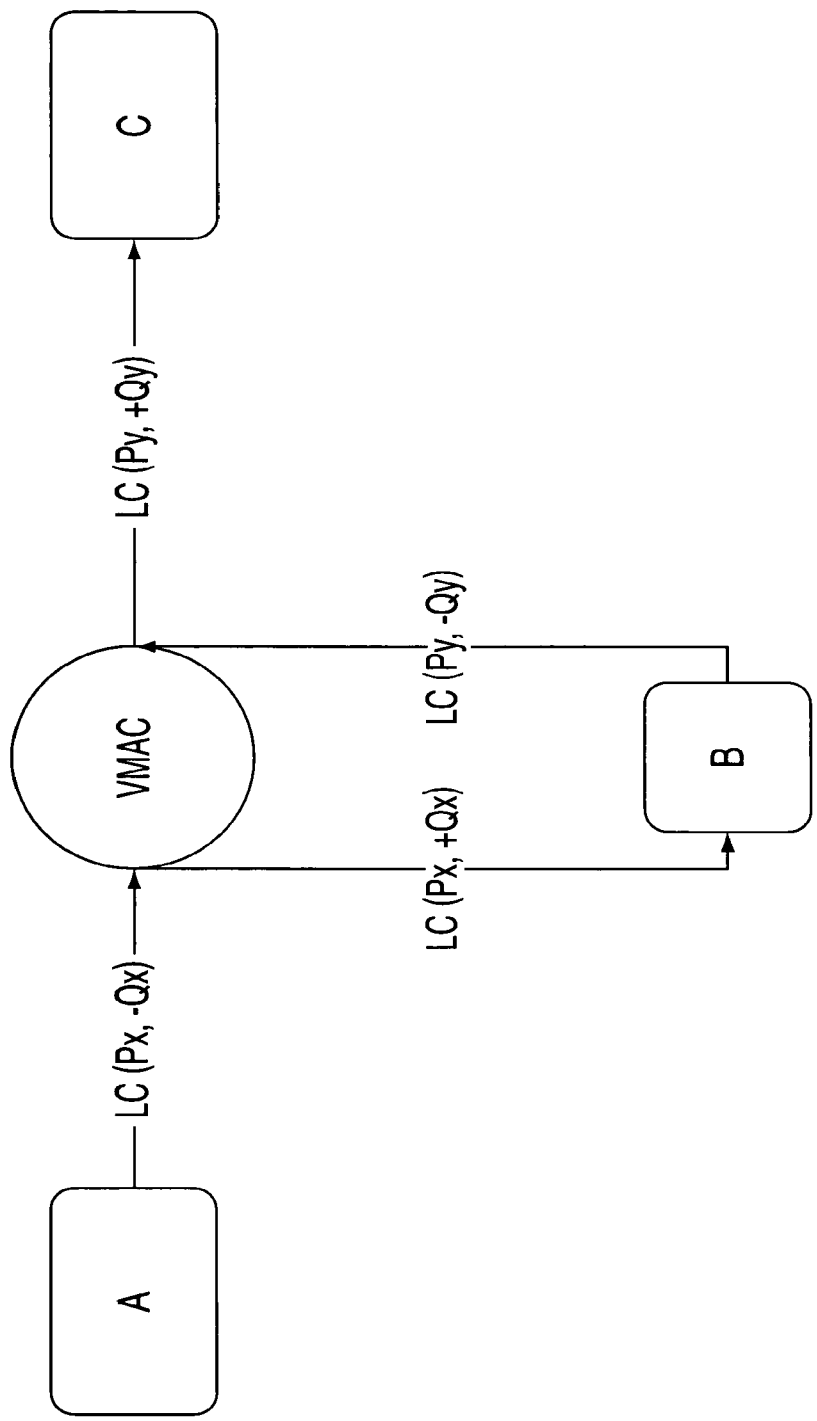
FIG. 5 is a block diagram of paired basis swaps in accordance with the invention.

If Swap Entity 100 is to is to maintain a high credit quality, it must either fund all possible risks of default of one of the paired swap counterparties (A or B) or it must maintain a balanced book at all times. As described above, Swap Entity 100 follows a series of rules for maintaining such a balanced swap book at all times. These rules include automatic termination of a swap if a counterparty defaults and payment of a Termination Payment on the termination of a swap. This Termination Payment is designed to compensate the terminated party for potential market moves, and/or cash requirements related to replacing of contracts, and as such is related to the Value at Risk (VAR) associated with the quantity and product of the swap. It is possible, and likely, that the VAR of a long position LC(P,Q) is different from the VAR of a short position LC(P,−Q). Next, there must be appropriate collateralization of the total net Termination Payments payable to Swap Entity 100 in the event of a default by a counterparty. Also, Swap Entity 100 has the option to cancel the swap of the non-defaulting swap counterparty by making a payment (the Termination Payment) and an option to enter into a new swap with terms correlated to the cancelled swap utilizing the Swaption right included in the paired swaps with Swap Entity 100. Finally, in cases where the defaulting party has two identical and off-setting swaps with Swap Entity 100, it is possible for the Swap Entity to re-form the swap arrangements such that each of the counterparties in the paired basis swap contracts related to Counterparty B can be joined so that they retain the same swap as before but with a different paired swap counterparty through Swap Entity 100. An approach has been developed to minimize the collateral a participant is required to post with the Swap Entity for a portfolio of off-setting correlated swaps. This approach is as follows:

For off-setting swaps, one swap (say, swap x) must be a floating payor, while the other swap (say, swap y) must be a floating receiver. For any pair of swaps to be netted against each other (as shown in FIG. 5, where Counterparty B has a swap on product x and a swap on product y) three components are determined, a. Correlation amount: The collateral required to compensate for potential price movements over a given holding period, adjusted for correlations in price movements. If product x and y are correlated by a correlation factor of 90% (or 0.9) for price movements over a given holding period, then this Correlation Amount is CA=(1−correlation factor)*[LCx(Px,Qx)+LCy(Py,Qy)], where Q is the quantity being netted.

b. Net change in collateral requirement if the A swap is called: In the event that B defaults, the Swap Entity has the right to call either swap x with A or swap y with C. If the Swap Entity calls swap x with A, and replaces the swap with swap y through executing its Swaption to provide a correlated swap, the new collateral requirement for A will be based on A being a floating payor under swap y. Therefore, Counterparty A will have a net change in collateral of dLC(A)=[LCy(Py,−Q)−LCx(Px,−Q)].

c. Net change in collateral requirement if the C swap is called: In the event that B defaults, the Swap Entity has the right to call either swap x with A or swap y with C. If the Swap Entity calls swap x with A, and replaces the swap with swap y through executing its option to provide a correlated swap, the new collateral requirement for A will be based on A being a floating payor under swap y. Therefore A will have a net change in collateral of dLC(C)=[LCx(Px,Q)−LCy(Py,Q)].

The method states that the Swap Entity will call the swap with the lowest dLC (change in LC) and the amount payable to the terminated swap counterparty would be: CA+dLC, but not less than 0. Therefore, the equation utilized in the calculation of net collateral required of a counterparty by the Swap Entity for any netted pair of swaps on products x and y for quantity Q, would be: Max(CA+min[(LCy(Py,−Q)−LCx(Px,−Q)),(LCx(Px,Q)−LCy(Py,Q))],0), Again, looking at FIG. 5, with respect to product x, with respect to B's default, the System may call the A-System x swap and replace it with an A-System y swap with a notional quantity of the netting amount (Qn). The new Counterparty A collateral requirement is now LC(Py,−Qn), and the collateral call (release) is LC(Py,−Qn)−LC(Px,−Qn). Similarly, as shown with respect to product y, in the event of Counterparty B's default, the System may call the C-System x swap with a notional quantity of the netting amount (Qn). The new Counterparty C collateral requirement is now LC(Px,Qn), and the collateral call (release) is LC(Px,Qn)−LC(Py,Qn). Note, the System will call the swap which results in the lowest call (or largest release) of collateral. In this way, the collateral requirements of the swap counterparties are reduced.

Once a forward contract reaches its performance date, generally, performance of power and gas contracts are performed over a period of time, such as a month, rather than delivery of the entire value of the contract on one date. For example, as shown in FIGS. 6, 7, 8, and 9, a 25 MW Monthly Peak contract which requires delivery of power during the weekdays of a month is shown for April 2003. The contract is intended to deliver 400 Megawatt Hours (MWHs) per weekday during the course of the month of April 2003, which has 22 weekdays, resulting in a notional quantity of 8800 MWHs for the entire contract. FIG. 6 shows, in schedule form, the daily quantity, the remaining quantity after the day and the notional quantity at the beginning of the day for a swap used to hedge a forward contract during delivery.

Under traditional approaches, settlement of the forward contracts is made either at the end or at the beginning of the contract with one or the other party having the risk of non-payment or non-delivery of the entire contract. Generally, payment is made at the end of the period so that the delivering party delivers the commodity and then must obtain payment for the notional quantity and any reconciliation variances between the notional quantity and the actual quantity delivered in accordance with traditional practice. However, this exposes the parties to risk of defaults of a substantial basis and there is a need to monitor and arrange for payments on a basis concurrent with the notional performance of the contract. In this way, if one or the other party defaults under the agreement at some point during the period for performance, the non-defaulting counterparty has the ability to stop its performance and mitigate its damages. For example, if the party delivering the product fails to deliver the commodity, the non-defaulting counterparty would be able to stop payment beyond payment made for the product actually delivered, rather than paying through the end of the contract and then attempting to obtain its remedies. Similarly, where payments are not made currently, the performing party can cease delivery of the commodity to the defaulting counterparty.

Accordingly, in accordance with another preferred embodiment of the invention, Applicants have arranged for a continuation of the collateralization and risk mitigation associated with forward contract through the physical delivery period of the contract. What is done is a daily settlement of the notional performance and payment based upon notional performance in an automatic and prearranged fashion which assures that appropriate payments are made and any defaults are noted on a day-by-day basis, so that payments are made.

Figure 9:
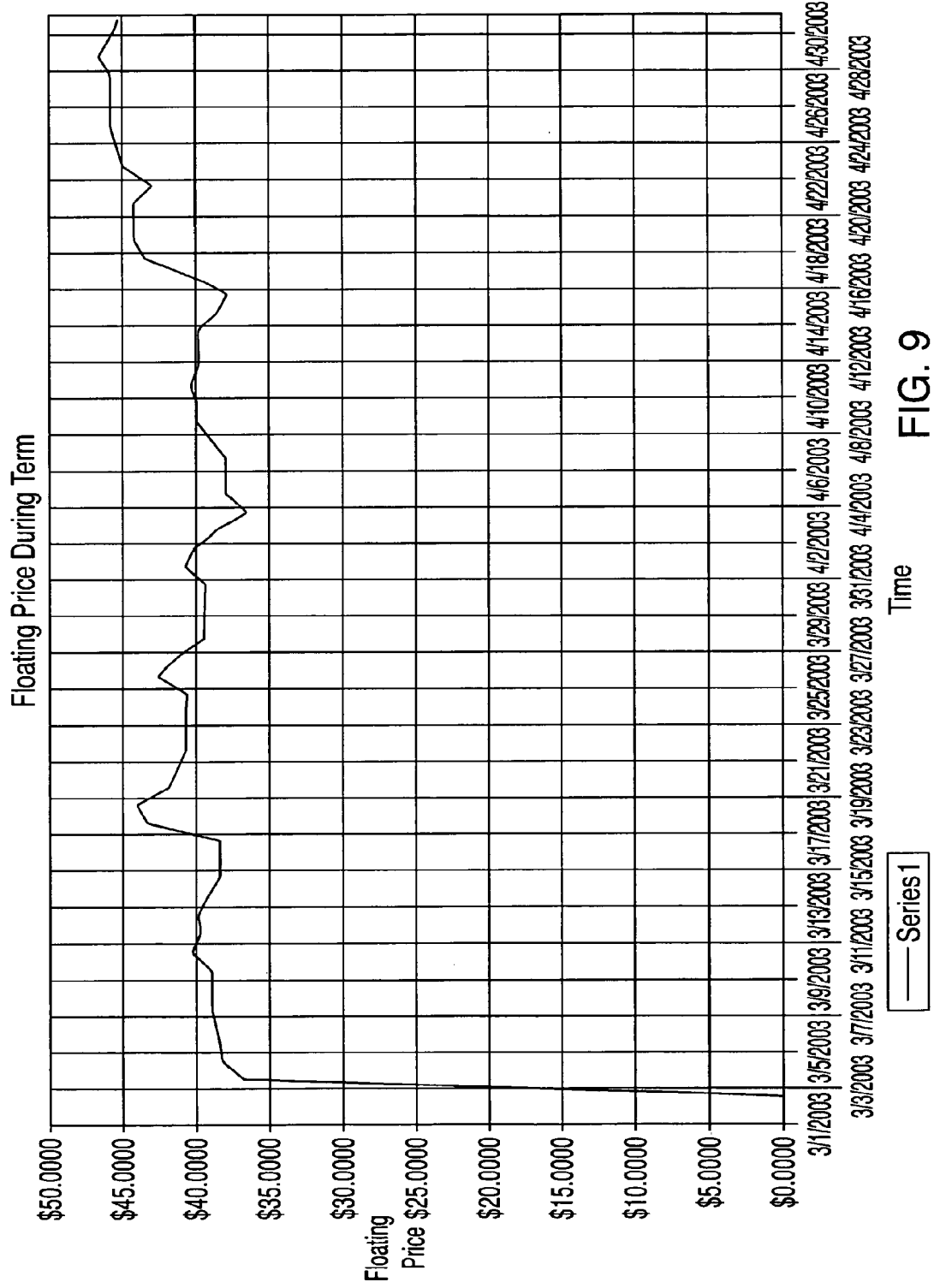
FIG. 9 is a graph of the Floating Price of a contract utilized in connection with FIGS. 6, 7 and 8.

Similarly, whereas the parties had appropriate collateral during the financial swaps portion of the transaction, the collateral is retained and reduced as the remaining quantity of the contract decreases over time with payment and performances. FIGS. 7 and 8 show sample product schedules associated with the same contract of FIG. 6, FIG. 7 being the cash flows of the Seller and FIG. 8 being the cash flows of the Buyer. The contract price is an initial Fixed Price. For the next day, the payments required would be the Fixed Price minus the Floating Price, if the fixed amount is received as required. These amounts do not vary the actual payments under the contract to the Seller or required to be paid by the Buyer to the Seller, but modify the collateral remaining to protect both parties against the non-performance by the other. In this way, the System automatically updates on a daily basis, adjusted to the market price on the previous day, the variation between the contract price and the market price, so that, in the event of a default, a cover transaction could be entered into at the market price in effect on the date prior to default. FIG. 9 shows the Floating Price through the term which varies from prices below the contract price of $40 to prices above the contract price. To the extent that the Floating Price is below the contract price, if there is a default under the swap by the Buyer and the Seller's swap is terminated, then the Seller will have received this price differential which it can use to mitigate the replacement of the hedged forward contract by finding a new buyer at the lower market price. Similarly, if the price is above the contract price, if there is a default under the swap by the Seller and the Buyer's swap is terminated, then the Buyer will have received this price differential which it can use to mitigate the replacement of the hedged forward contract by finding a new Seller at the higher market price. Regardless of the daily payments, the parties would still need to do an end-of-term reconciliation as to the comparison between the notional amount of product to be delivered and the actual amount delivered and any other usual commercial adjustments. However, the magnitude of these reconciliations and adjustments are generally rather small compared to the contract price, and, thus, not a major factor in credit risk analyses. By use of the daily settlement system in which the parties make all payments through the System's accounts whereby funds must be in place at the time they are required for daily payment as called for in the contract, or in connection with the collateral requirements to maintain the credit risk mitigation system enabled during the forward contract phase to the physical delivery phase, daily collateral requirements are automatically debited from accounts held by the contract participants into and out of the System's escrow and operating accounts. Thus, the swap participants, when they actually commence performance, do not have to deal with billing and collection of the contract price because the entire operation is coordinated by and operated by the System, with enhanced credit risk mitigation built in through the use of the continuing collateral requirements. Of course, as the remaining value of the contract is reduced, the amount of the collateral required, similarly, is reduced.

It is important to understand that the daily settlement approach to the contract enabled with the collateral risk mitigation system is not an insurance policy or other assurance device which guarantees payment in any fashion. Rather, it provides a level of securitization of the exposure such that the maximum loss should be equal to one day's performance or payment, together with the market risk from one day to the next. The payments on both sides are monitored and enabled by the daily settlement system, which notes default if either counterparty fails to make a payment or collateral placement when required. Such a default will put the non-defaulting counterparties in a position where they may elect to declare default on the hedged forward contracts and cease performance secure in the knowledge that the daily settlement system has enabled all payments to it through the previous day, and there is sufficient collateral being held by the daily settlement system to adjust the value of the contract between the Fixed Price of the contract and the Floating Rate for the contract commodity as of the date prior to default.

In this way the risk associated with the performance and receipt of payment in connection with a physical contract are mitigated, operational activities required to be instituted by the parties reduced, collection and billing activities are minimized and better control over risks and costs are enabled.

While the calculation of the Termination Amount for a swap is not critical so long as all counterparties agree to the formula or algorithm utilized by the Swap Entity the current preferred embodiment of the invention uses the following methodology to calculate the Termination Payment. The first step in determining the risk around a position and, therefore, the liquidity coverage is to specify the price process that drives price changes. As the System provides protection for both forward contracts and positions during the delivery period, we specify the process for both the spot price and the forward curve. To provide the proper liquidity coverage during the settlement period, we need to take into account the dynamics of the spot price process. In other words, the methodology must recognize that spot prices frequently revert back to long run means, limiting potential exposure. While we could model each forward point this would be an extremely cumbersome process. To reduce the size of this task we attempt to reduce the overall dimensionality of the problem. We accomplish this by using factor analysis. If we identify a few factors that drive much of the price changes, then it will be easier to specify the volatility for any point on the forward curve. One advantage of factor models is that each factor is normally distributed and independent of the other factors. We identify the factors for each set of forward curves in the following manner. 1) Calculate the covariance matrix of the forward curve returns. 2) Calculate the eigen values of the covariance matrix. Eich eigen value can be associated with a single risk factor. 3) Identify the set of factors that explains the greatest proportion of variance. 4) Calculate the associated eigen vectors of the covariance matrix. The eigen vector associated with a specific eigen value represents the weighting of that factor, w, on a given forward contract.

Once the important factors have been identified and the weights are known, then forward prices are affected by the factors in a summation. Once the spot and forward price processes have been specified we can then determine the variance process. We use a variance process that allows for seasonal fluctuations and systematic variance changes driven by price level.

For the spot process we specify the following model:

$$_s\sigma_i^2 = \max\left\{\alpha_{i,s} + \beta_{0,i,s}S_{i,t} + \sum_{f=1}^{k}(\beta_{f,i,s}\sin(2\pi tf) + \gamma_{f,i,s}\cos(2\pi tf)), m_{i,s}\right\}$$

where:
$_s\sigma^2$ refers to the spot price variance
i refers to the $i^{th}$ commodity
f is an iteration factor
t is the current date in years
(i.e. October 1 would equal 274 days/365 days or 0.7507)
α, β, γ and m represent calculated parameters
π is the number pi and equals 3.1415 . . .
k refers to the number of seasonal components (usually 4 or 5)
S is the spot price The spot price volatility is simply the square root of the variance.

Forward Price Volatility

To determine the volatility of the forward contracts, we first specify the process for the factor variance.

$$_F\sigma_{i,j}^2 = \max\left\{\alpha_{i,j} + \beta_{0,i,j}\bar{P} + \sum_{f=1}^{k}(\beta_{f,i,j}\sin(2\pi tf) + \gamma_{f,i,j}\cos(2\pi tf)), m_{i,j}\right\}$$

where:
$_F\sigma^2$ refers to the factor variance
i refers to the $i^{th}$ commodity
j refers to the $j^{th}$ factor (we expect up to 10 factors)
f is an iteration factor
t is the current date in years
(i.e. October 1 would equal 274 days/365 days or 0.7507)
α, β, γ and m represent parameters that are specified
π is the number pi and equals 3.1415 . . .
k refers to the number of seasonal components (usually 4 or 5)
$\bar{P}$ refers to the average price of the first twelve contracts Given the factor variances and factor weightings we can calculate the commodity variance:

$$_c\sigma_{i,\tau}^2 = E_{i,\tau} + \sum_{j=1}^{k}(w_{i,j,\tau}^2 + {_F\sigma_{i,j,t}^2})$$

where
$_c\sigma^2$ refers to the commodity variance
i refers to the $i^{th}$ commodity
j refers to the $j^{th}$ factor
w refers to the weighting of a given factor
E is a residual volatility parameter
τ refers to the time to expiration of the commodity (generally in months)
$_F\sigma^2$ refers to the factor variance Liquidity Coverage Given the spot and forward volatilities, we can determine the appropriate liquidity coverage for any asset. This process is equivalent to determining a value at risk for the position.

Delivery Month Liquidity Coverage

The liquidity coverage is meant to protect against a shock in prices. For the delivery month coverage we need to know the impact of a shock in spot prices on prices for the remainder of the delivery period. In assets with high mean reversion, a shock to the spot price will have little impact on expected future spot prices, while in those with low mean reversion a shock to the spot price may significantly impact expected future spot prices. Therefore, to calculate the liquidity coverage within the delivery month we need to know the days remaining in the delivery period and the speed of mean reversion.

The liquidity coverage over a one-day settlement period is equal to:

$$LC = \left|\sum_{m=1}^{T_d} b_i^m S_{i,t} Q\left(\exp\left[-\frac{|Q|}{Q} * C *{_s\sigma}\right] - 1\right)\right|$$

which is equivalent to:

$$LC = \left|\frac{b_i(1 - b_i^{T_j})}{1 - b_t} S_{i,t} Q\left(\exp\left[-\frac{|Q|}{Q} * C *{_s\sigma}\right] - 1\right)\right|$$

where
LC is the liquidity coverage
b is the mean reverting parameter (from equation 1)
i refers to the $i^{th}$ commodity
$T_d$ are the remaining days in the delivery period
S is the spot price
Q is the daily quantity
exp is the exponential function
C is a risk multiplier and can be derived from the inverse of the cumulative normal distribution.
$_s\sigma$ refers to the spot price volatility
The function |.| represents the absolute value of the number Therefore, to determine the liquidity coverage for any contract we need to specify the commodity, the current spot price, the time to delivery of the contract, and the contract quantity.

Forward Contract Liquidity Coverage

The liquidity coverage for the forward contracts is meant to protect against potential price changes in the forward curve. Again we use the basic VaR methodology to determine the coverage level. We assume that a long position is denoted by a positive quantity and a short position by a negative quantity.

$$LC = \left|P_{i,\tau} Q\left(\exp\left[-\frac{|Q|}{Q} * C *{_c\sigma_{i,\tau}} * \sqrt{T_{i,\tau}}\right] - 1\right)\right|$$

where
LC is the liquidity coverage
P refers to the current price of the commodity we are concerned with
i refers to the $i^{th}$ commodity
τ refers to the time to expiration of the commodity generally in months
Q refers to the quantity owned of the asset
exp is the exponential function
C is a risk multiplier and can be derived from the inverse of the cumulative normal distribution.
$_c\sigma$ refers to the commodity price volatility T refers to the holding period in terms of days selected based on liquidity The function |.| represents the absolute value of the number Therefore when we calculate the liquidity coverage for any forward contract we need the average price for the first 12 months of contracts, the current underlying price, and the quantity held.

Full Liquidity Coverage Equations

Substituting where appropriate we can derive the full equations for the liquidity coverage.

For any delivery month exposures the liquidity coverage is:

$$LC = \left| \frac{b_i(1-b_i^{Td})}{1-b_i} S_{i,t} Q \left( \exp\left[ -\frac{|Q|}{Q} * C * \sqrt{\max\{\alpha_{i,s} + \beta_{0,i,s} S_{i,t} + \sum_{f=1}^{k}(\beta_{f,i,s}\sin(2\pi tf) + \gamma_{f,i,s}\cos(2\pi tf)), m_{i,s}\}} \right] - 1 \right) \right|$$

The all forward positions, the liquidity coverage is:

$$LC = \left| P_{i,\tau} Q \left( \exp\left[ -\frac{|Q|}{Q} * C * \sqrt{E_{i,s} + \sum_{j=1}^{k}(w_{i,j,\tau}^2 * \max\{\alpha_{i,j} + \beta_{0,i,j}\overline{P} + \sum_{f=1}^{k}(\beta_{f,i,j}\sin(2\pi tf) + \gamma_{f,i,j}\cos(2\pi tf)), m_{i,j}\})} * \sqrt{T_{i,\tau}} \right] - 1 \right) \right|$$

It will thus be seen that the objects set forth above, among those made apparent in the proceeding description, are efficiently obtained and, since certain changes may be made in the above constructions and processes without departing from the spirit and scope of the invention, it is intended that all matter contained in the above description or shown in the accompanied drawings shall be interpreted as illustrative, and not in the limiting sense.

It will also be understood that the following Claims are intended to cover all of the generic and specific features of the invention, herein described and all statements of the scope of the invention which, as a matter of language, might be said to fall therebetween.

What is claimed is:

1. A credit risk mitigation system for swap transactions between counterparties, comprising:
    pairs of the counterparties, interested in forming a swap with each other:
    a system counterparty, which forms paired swaps with pairs of counterparties interested in forming a swap; the system counterparty making paired, balanced offsetting swaps with the individual members of a pair of counterparties interested in forming a swap and simultaneously creating a swaption with each of the pair of counterparties, the system counterparty including:
    a data storage means retaining all of the swaps the system counterparty enters into with each other counterparty;
    communication means coupled to the system counterparty allowing the system counterparty to communicate with potential pairs of counterparties interested in forming the swap to receive potential swap contract information and to communicate paired swap information to accepted pairs of counterparties and collateral requirements with each accepted swap between the system counterparty and the other counterparty to such swap;
    termination means coupled to the system counterparty determining if a counterparty to an accepted swap is in default and if in default selecting an appropriate response.

2. The credit risk mitigation system of claim 1, wherein the appropriate response is a termination of the swap with a non-defaulting paired swap counterparty with a termination payment to the non-defaulting paired swap counterparty.

3. The credit risk mitigation system of claim 1, wherein the appropriate response is a re-pairing of the swap with a non-defaulting counterparty with an equal offsetting swap.

4. The credit risk mitigation system of claim 1, wherein the appropriate response is a re-pairing of the swap with a non-defaulting counterparty with a correlated offsetting swap which is terminated and replaced by an equal offsetting swap and a correlated termination payment to the non-defaulting counterparty.

5. The credit risk mitigation system of claim 1 wherein the appropriate response includes the termination of all of the accepted swaps of a counterparty which is in default, thereby creating an unpaired swap for each such terminated swap, the system counterparty also taking an appropriate response as to each non-defaulting counterparty's unpaired swap.

6. The credit risk mitigation system of claim 5 wherein the appropriate response as to an unpaired swap is re-pairing one non-defaulting counterparty's unpaired swap with another non-defaulting counterparty's equal offsetting unpaired swap to form a new pair of swaps between two non-defaulting counterparties and the system counterparty.

7. The credit risk mitigation system of claim 6 wherein the appropriate response as to an unpaired swap between a non-defaulting counterparty and the system counterparty which the system counterparty is unable to re-pair with another unpaired equal offsetting swap of another non-defaulting counterparty is a re-pairing of one unpaired swap between one non-defaulting counterparty and the central counterparty with a correlated offsetting unpaired swap between the central counterparty and another non-defaulting counterparty which is terminated in favor of an equal offsetting swap and a correlation termination payment to the non-defaulting counterparty to create a new pair of swaps between two non-defaulting counterparties and the system counterparty.

8. The credit risk mitigation system of claim 7 wherein the appropriate response as to an unpaired swap between a non-defaulting counterparty and the system counterparty which the system counterparty is unable to either re-pair with another unpaired equal offsetting swap of another non-defaulting counterparty or re-pair after terminating a correlated offsetting unpaired swap of another non-defaulting counterparty is to terminate the unpaired swap between the non-defaulting counterparty and the system counterparty and make a termination payment to the non-defaulting counterparty.

9. The credit risk mitigation system of claim 5 wherein the appropriate response as to an unpaired swap is a re-pairing of one unpaired swap between one non-defaulting counterparty and the central counterparty with a correlated offsetting unpaired swap of another non-defaulting counterparty, which correlated offsetting unpaired swap is terminated in favor of an equal offsetting swap and a correlation termination payment to the non-defaulting counterparty to create a new pair of swaps between two non-defaulting counterparties and the system counterparty.

10. The credit risk mitigation system of claim 5 wherein the appropriate response as to an unpaired swap is a termination of the non-defaulting counterparty's unpaired swap and a termination payment to the non-defaulting counterparty.

11. The credit risk mitigation system of claim 5 wherein the appropriate response to a default by one counterparty to paired swaps with the central counterparty includes choosing one of the following for a swap between the central counterparty with a non-defaulting party: re-pairing the swap with another equal offsetting swap between the central counterparty and another non-defaulting party; re-pairing the swap with another non-defaulting counterparty's equal offsetting swap which is formed by that counterparty's correlated offsetting swap between the central counterparty and another non-defaulting counterparty being terminated and replaced by the equal offsetting swap and a correlation termination payment; terminating the swap in favor of a correlated swap and a correlation payment with the correlated swap re-paired with another non-defaulting counterparty's correlated offsetting swap; and terminating the swap and making a termination payment to the non-defaulting party.

12. The credit risk mitigation system of claim 1 wherein the appropriate response to a default by one counterparty to paired swaps with the central counterparty includes choosing one of the following for a swap between the central counterparty with a non-defaulting party: re-pairing the swap with another equal offsetting swap between the central counterparty and another non-defaulting party; re-pairing the swap with another non-defaulting counterparty's equal offsetting swap which is formed by that counterparty's correlated offsetting swap between the central counterparty and another non-defaulting counterparty being terminated and replaced by the equal offsetting swap and a correlation termination payment; terminating the swap in favor of a correlated swap and a correlation payment with the correlated swap re-paired with another non-defaulting counterparty's correlated offsetting swap; and terminating the swap and making a termination payment to the non-defaulting party.

13. The credit risk mitigation system of claim 12 wherein an appropriate response as to each of the non-defaulting counterparties' unpaired swaps is selected by ranking the swaps in a manner which allows a systematic selection of the exercise of swaptions in order to minimize the total cost to the system counterparty after termination of all of a defaulting party's swaps.

14. The credit risk mitigation system of claim 13 wherein the system counterparty uses the volatility of a price index applicable to each swap to rank the swaps.

15. The credit risk mitigation system of claim 1 wherein an appropriate response as to each of the non-defaulting counterparties' unpaired swaps is selected by ranking the swaps in a manner which allows a systematic selection of the exercise of swaptions in order to minimize the total cost to the system counterparty after termination of all of a defaulting party's swaps.

16. The credit risk mitigation system of claim 15 wherein the system counterparty uses the volatility of a price index applicable to each swap to rank the swaps.

17. The credit risk mitigation system for swap transactions between counterparties of claim 1 wherein the paired swaps are structured to cover payments due on an underlying forward contract between the counterparties to the paired swaps with the central counterparty.

18. The credit risk mitigation system for swap transactions between counterparties of claim 17 wherein the paired swaps are structured to cover the outstanding notional quantities due on the underlying forward contract between the counterparties to the paired swaps with the central counterparty.

19. The credit risk mitigation system for swap transactions between counterparties of claim 1 wherein the paired swaps are structured to cover the outstanding notional quantities due on the underlying forward contract between the counterparties to the paired swaps with the central counterparty.

20. The credit risk mitigation system for swap transactions between counterparties of claim 1 wherein the communication means recalculates the collateral requirements for each accepted swap on a periodic basis.

21. The credit risk mitigation system for swap transactions between counterparties of claim 20 wherein the collateral requirements are recalculated on a daily basis.

22. The credit risk mitigation system for swap transactions between counterparties of claim 21 wherein the collateral the central counterparty requires from a counterparty for a paired swap is calculated based on a notional delivery quantity and the required collateral declines according to a notional delivery schedule.

23. The credit risk mitigation system for swap transactions between counterparties of claim 21 wherein the collateral the central counterparty requires from a counterparty for a paired swap is calculated based on the outstanding notional quantities from the swap.

24. The credit risk mitigation system for swap transactions between counterparties of claim 21 wherein collateral in excess of the amount the central counterparty requires from a counterparty for each of its accepted swaps provides a measure of the counterparty to enter into additional paired swaps without having to provide additional collateral.

25. The credit risk mitigation system for swap transactions between counterparties of claim 21 wherein the collateral the central counterparty requires from a counterparty for a paired swap is controlled by the central counterparty.

26. The credit risk mitigation system for swap transactions between counterparties of claim 1 wherein the collateral requirements for a counterparty's accepted swaps are calculated based on the cost to the central counterparty upon the default of that counterparty.

27. The credit risk mitigation system for swap transactions between counterparties of claim 26 wherein the central counterparty ranks products in a manner which allows a systematic selection of the exercise of appropriate responses in order to minimize the total cost of appropriate responses in the event of a counterparty's default.

28. The credit risk mitigation system for swap transactions between counterparties of claim 26 wherein collateral required of a counterparty is set equal to the total cost of the appropriate responses the central counterparty will take in the event of the counterparty's default so that the central counterparty's liability upon a counterparty's default will be equal to the collateral it has from the defaulting counterparty.

29. The credit risk mitigation system for swap transactions between counterparties of claim 28 wherein the collateral the central counterparty requires from a counterparty is set so as to allow the central counterparty to maintain a flat book in the event of the counterparty's default.

30. The credit risk mitigation system of claim 29 wherein the appropriate response to a default by one counterparty to paired swaps with the central counterparty includes choosing one of the following for each swap between the central counterparty with a non-defaulting party which had been previously paired with a swap between the central counterparty and the defaulting counterparty: re-pairing the swap with another swap between the central counterparty and another non-defaulting party; re-pairing the swap with another non-defaulting counterparty's matching swap which is formed by that counterparty's correlated swap between the central counterparty and another non-defaulting counterparty being terminated and replaced by the matching swap and a correlation payment; terminating the swap in favor of a correlated swap and a correlation payment with the correlated swap re-paired with another non-defaulting counterparty's matching swap; and terminating the swap and making a termination payment.

31. The credit risk mitigation system for swap transactions between counterparties of claim 1 wherein collateral in excess of the amount the central counterparty requires from a counterparty for each of its accepted swaps provides a measure of the counterparty to enter into additional paired swaps without having to provide additional collateral.

32. The credit risk mitigation system for swap transactions between counterparties of claim 1 wherein the termination means further includes a termination of a paired swap between two non-defaulting counterparties upon both non-defaulting counterparties instructing the central counterparty to terminate the paired swap.

33. A method of risk mitigation and collateralization of a swap used to hedge a forward contract, comprising:
qualifying a plurality of eligible counterparties, pairs of which desire to form swaps;
forming offsetting paired swaps with a central swap authority for each of the pairs of counterparties utilizing a data storage device coupled to the central swap authority for storing all of the swaps the system counterparty enters into with each other counterparty and a communication device coupled to the central swap authority to communicate the formation of the paired swaps to each of the pairs of counterparties;
evaluating an initial fixed value at risk for each counterparty to the swaps with the central swap authority utilizing a communication device coupled to the data storage device of the central swap authority;
calculating an initial collateral requirement for each counterparty to a swap with the central swap authority based on an agreed upon termination payment;
assuring that required collateral by each counterparty is in the central swap authority's possession each delivery day;
transferring the payment under the forward contract from one counterparty's funds held by the central swap authority to the other counterparty's control for each day's notional delivery under the forward contract;
determining a floating rate index contract price for a day;
updating new collateral requirements based on the difference between the fixed rate contract price and the floating rate index contract price for the previous day;
terminating the paired swap utilizing a termination device coupled to the central swap authority if one of the counterparties defaults in any of its obligations to make payments to the central swap authority.

34. A method of risk mitigation and collateralization of a swap used to hedge a forward contract, comprising:
qualifying a plurality of eligible counterparties, pairs of which desire to form swaps;
forming offsetting paired swaps with a central swap authority for each of the pairs of counterparties utilizing a data storage device coupled to the central swap authority for storing all of the swaps the system counterparty enters into with each other counterparty and a communication device coupled to the central swap authority to communicate the formation of the paired swaps to each of the pairs of counterparties;
evaluating an initial fixed value at risk for each counterparty to the swaps with the central swap authority utilizing a communication device coupled to the data storage device of the central swap authority;
calculating an initial collateral requirement for each counterparty to a swap with the central swap authority based on an agreed upon termination payment;
assuring that required collateral by each counterparty is in the central swap authority's possession each delivery day;
transferring the payment under the forward contract from one counterparty's funds held by the central swap authority to the other counterparty's control for each day's notional delivery under the forward contract;
determining a floating rate index contract price for a day;
updating new collateral requirements based on the difference between the fixed rate contract price and the floating rate index contract price for the previous day;
terminating the paired swap utilizing a termination device coupled to the central swap authority if one of the counterparties defaults in any of its obligations to make payments to the central swap authority and making the agreed upon termination payment to the non-defaulting paired swap counterparty or exercising a swaption with such counterparty.

35. A method of risk mitigation and collateralization of a swap used to hedge a forward contract, comprising:
qualifying a plurality of eligible counterparties, pairs of which desire to form at least one contracts with each other;
forming offsetting paired contracts with a central swap authority for each of the pairs of counterparties utilizing a data storage device coupled to the central swap authority for storing all of the contracts the system counterparty enters into with each other counterparty and a communication device coupled to the central swap authority to communicate the formation of the paired contracts to each of the pairs of counterparties;
evaluating an initial fixed value at risk for each counterparty to the contract with the central swap authority utilizing a communication device coupled to the data storage device of the central swap authority;
calculating an initial collateral requirement for each counterparty to the contract with the central swap authority based on an agreed upon termination payment;
assuring that required collateral by each counterparty is in the central swap authority's possession each delivery day;
transferring the payment under the forward contract from one counterparty's funds held by the central swap authority to the other counterparty's control for each day's notional delivery under the forward contract;
determining a floating rate index contract price for a day;
updating new collateral requirements based on the difference between the fixed rate contract price and the floating rate index contract price for the previous day;
terminating the paired contract utilizing a termination device coupled to the central swap authority if one of the counterparties defaults in any of its obligations to make payments to the central swap authority.

36. A method of risk mitigation and collateralization of a swap used to hedge a forward contract, comprising:
qualifying a plurality of eligible counterparties, pairs of which desire to form at least one contract with each other;

forming offsetting paired contracts with a central swap authority for each of the pairs of counterparties utilizing a data storage device coupled to the central swap authority for storing all of the contracts the system counterparty enters into with each other counterparty and a communication device coupled to the central swap authority to communicate the formation of the paired swaps to each of the pairs of counterparties;

evaluating an initial fixed value at risk for each counterparty to the contract with the central swap authority utilizing a communication device coupled to the data storage device of the central swap authority;

calculating an initial collateral requirement for each counterparty to the contract with the central swap authority based on an agreed upon termination payment;

assuring that required collateral by each counterparty is in the central swap authority's possession each delivery day;

transferring the payment under the forward contract from one counterparty's funds held by the central swap authority to the other counterparty's control for each day's notional delivery under the forward contract;

determining a floating rate index contract price for a day;

updating new collateral requirements based on the difference between the fixed rate contract price and the floating rate index contract price for the previous day;

terminating the paired contract utilizing a termination device coupled to the central swap authority if one of the counterparties defaults in any of its obligations to make payments to the central swap authority and making the agreed upon termination payment to the non-defaulting paired contract counterparty or exercising a right to enter into a new contract with such counterparty.

37. A credit risk mitigation system for contract transactions between counterparties, comprising:
   pairs of the counterparties, interested in forming a contract with each other:
   a system counterparty, which forms paired contracts with pairs of counterparties interested in forming a contract; the system counterparty making paired, balanced offsetting contracts with the individual members of a pair of counterparties interested in forming a contract and simultaneously creating a right of the system counterparty to enter into a new contract with each of the pair of counterparties, the system counterparty including:
   a data storage means retaining all of the contracts the system counterparty enters into with each other counterparty;
   communication means coupled to the system counterparty allowing the system counterparty to communicate with potential pairs of counterparties interested in forming the contract to receive potential contract information and to communicate paired contract information to accepted pairs of counterparties and collateral requirements with each accepted contract between the system counterparty and the other counterparty to such contract;
   termination means coupled to the system counterparty determining if a counterparty to an accepted paired contract is in default and if in default selecting an appropriate response.

38. The credit risk mitigation system of claim 37, wherein the appropriate response is a termination of the contract with a non-defaulting paired contract counterparty with a termination payment to the non-defaulting paired contract counterparty.

39. The credit risk mitigation system of claim 37, wherein the appropriate response is a re-pairing of the contract with a non-defaulting counterparty with an equal offsetting contract.

40. The credit risk mitigation system of claim 37, wherein the appropriate response is a re-pairing of the contract with a non-defaulting counterparty with a correlated offsetting contract which is terminated and replaced by an equal offsetting contract and a correlated termination payment to the non-defaulting counterparty.

41. The credit risk mitigation system of claim 37 wherein the appropriate response includes the termination of all of the accepted contracts of a counterparty which is in default, thereby creating an unpaired contract for each such terminated contract, the system counterparty also taking an appropriate response as to each non-defaulting counterparty's unpaired contract.

42. The credit risk mitigation system of claim 41 wherein the appropriate response as to an unpaired contract is re-pairing one non-defaulting counterparty's unpaired contract with another non-defaulting counterparty's equal offsetting unpaired contract to form a new pair of contracts between two non-defaulting counterparties and the system counterparty.

43. The credit risk mitigation system of claim 42 wherein the appropriate response as to an unpaired contract between a non-defaulting counterparty and the system counterparty which the system counterparty is unable to re-pair with another unpaired equal offsetting contract of another non-defaulting counterparty is a re-pairing of one unpaired contract between one non-defaulting counterparty and the central counterparty with a correlated offsetting unpaired contract between the central counterparty and another non-defaulting counterparty which is terminated in favor of an equal offsetting contract and a correlation termination payment to the non-defaulting counterparty to create a new pair of contracts between two non-defaulting counterparties and the system counterparty.

44. The credit risk mitigation system of claim 43 wherein the appropriate response as to an unpaired contract between a non-defaulting counterparty and the system counterparty which the system counterparty is unable to either re-pair with another unpaired equal offsetting contract of another non-defaulting counterparty or re-pair after terminating a correlated offsetting unpaired contract of another non-defaulting counterparty is to terminate the unpaired contract between the non-defaulting counterparty and the system counterparty and make a termination payment to the non-defaulting counterparty.

45. The credit risk mitigation system of claim 41 wherein the appropriate response as to an unpaired contract is a re-pairing of one unpaired contract between one non-defaulting counterparty and the central counterparty with a correlated offsetting unpaired contract of another non-defaulting counterparty, which correlated offsetting unpaired contract is terminated in favor of an equal offsetting contract and a correlation termination payment to the non-defaulting counterparty to create a new pair of contracts between two non-defaulting counterparties and the system counterparty.

46. The credit risk mitigation system of claim 41 wherein the appropriate response as to an unpaired contract is a termination of the non-defaulting counterparty's unpaired contract and a termination payment to the non-defaulting counterparty.

47. The credit risk mitigation system of claim 41 wherein the appropriate response to a default by one counterparty to paired contracts with the central counterparty includes choosing one of the following for a contract between the central counterparty with a non-defaulting party: re-pairing the contract with another equal offsetting contract between the central counterparty and another non-defaulting party; re-pairing the contract with another non-defaulting counterparty's equal offsetting contract which is formed by that counterparty's correlated offsetting contract between the central counterparty and another non-defaulting counterparty being terminated and replaced by the equal offsetting contract and a correlation termination payment; terminating the contract in favor of a correlated contract and a correlation payment with the correlated contract re-paired with another non-defaulting counterparty's correlated offsetting contract; and terminating the contract and making a termination payment to the non-defaulting party.

48. The credit risk mitigation system of claim 37 wherein the appropriate response to a default by one counterparty to paired contracts with the central counterparty includes choosing one of the following for a contract between the central counterparty with a non-defaulting party: re-pairing the contract with another equal offsetting contract between the central counterparty and another non-defaulting party; re-pairing the contract with another non-defaulting counterparty's equal offsetting contract which is formed by that counterparty's correlated offsetting contract between the central counterparty and another non-defaulting counterparty being terminated and replaced by the equal offsetting contract and a correlation termination payment; terminating the contract in favor of a correlated contract and a correlation payment with the correlated contract re-paired with another non-defaulting counterparty's correlated offsetting contract; and terminating the contract and making a termination payment to the non-defaulting party.

49. The credit risk mitigation system of claim 48 wherein an appropriate response as to each of the non-defaulting counterparties' unpaired contracts is selected by ranking the contracts in a manner which allows a systematic selection of the exercise of rights of the system counterparty to enter into a new contract in order to minimize the total cost to the system counterparty after termination of all of a defaulting party's contracts.

50. The credit risk mitigation system of claim 49 wherein the system counterparty uses the volatility of a price index applicable to each contract to rank the contracts.

51. The credit risk mitigation system of claim 4 wherein an appropriate response as to each of the non-defaulting counterparties' unpaired contracts is selected by ranking the contracts in a manner which allows a systematic selection of the exercise of rights of the system counterparty to enter into a new contract in order to minimize the total cost to the system counterparty after termination of all of a defaulting party's contracts.

52. The credit risk mitigation system of claim 51 wherein the system counterparty uses the volatility of a price index applicable to each contract to rank the contracts.

53. The credit risk mitigation system for contract transactions between counterparties of claim 37 wherein the paired contracts are structured to cover payments due on an underlying forward contract between the counterparties to the paired contracts with the central counterparty.

54. The credit risk mitigation system for contract transactions between counterparties of claim 53 wherein the paired contracts are structured to cover the outstanding notional quantities due on the underlying forward contract between the counterparties to the paired contracts with the central counterparty.

55. The credit risk mitigation system for contract transactions between counterparties of claim 37 wherein the paired contracts are structured to cover the outstanding notional quantities due on the underlying forward contract between the counterparties to the paired contracts with the central counterparty.

56. The credit risk mitigation system for contract transactions between counterparties of claim 37 wherein the communication means recalculates the collateral requirements for each accepted contract on a periodic basis.

57. The credit risk mitigation system for contract transactions between counterparties of claim 56 wherein the collateral requirements are recalculated on a daily basis.

58. The credit risk mitigation system for contract transactions between counterparties of claim 57 wherein the collateral the central counterparty requires from a counterparty for a paired contract is calculated based on a notional delivery quantity and the required collateral declines according to a notional delivery schedule.

59. The credit risk mitigation system for contract transactions between counterparties of claim 57 wherein the collateral the central counterparty requires from a counterparty for a paired contract is calculated based on the outstanding notional quantities from the contract.

60. The credit risk mitigation system for contract transactions between counterparties of claim 57 wherein collateral in excess of the amount the central counterparty requires from a counterparty for each of its accepted contracts provides a measure of the counterparty to enter into additional paired contracts without having to provide additional collateral.

61. The credit risk mitigation system for contract transactions between counterparties of claim 57 wherein the collateral the central counterparty requires from a counterparty for a paired contract is controlled by the central counterparty.

62. The credit risk mitigation system for contract transactions between counterparties of claim 37 wherein the collateral requirements for a counterparty's accepted contracts are calculated based on the cost to the central counterparty upon the default of that counterparty.

63. The credit risk mitigation system for contract transactions between counterparties of claim 62 wherein the central counterparty ranks products in a manner which allows a systematic selection of the exercise of appropriate responses in order to minimize the total cost of appropriate responses in the event of a counterparty's default.

64. The credit risk mitigation system for contract transactions between counterparties of claim 62 wherein collateral required of a counterparty is set equal to the total cost of the appropriate responses the central counterparty will take in the event of the counterparty's default so that the central counterparty's liability upon a counterparty's default will be equal to the collateral it has from the defaulting counterparty.

65. The credit risk mitigation system for contract transactions between counterparties of claim 64 wherein the collateral the central counterparty requires from a counterparty is set so as to allow the central counterparty to maintain a flat book in the event of the counterparty's default.

66. The credit risk mitigation system of claim 65 wherein the appropriate response to a default by one counterparty to paired contracts with the central counterparty includes choosing one of the following for each contract between the central counterparty with a non-defaulting party which had been previously paired with a contract between the central counterparty and the defaulting counterparty: re-pairing the contract with another contract between the central counterparty and another non-defaulting party; re-pairing the contract with another non-defaulting counterparty's matching contract which is formed by that counterparty's correlated contract between the central counterparty and another non-defaulting counterparty being terminated and replaced by the matching contract and a correlation payment; terminating the contract in favor of a correlated contract and a correlation payment with the correlated contract re-paired with another non-defaulting counterparty's matching contract; and terminating the contract and making a termination payment.

67. The credit risk mitigation system for contract transactions between counterparties of claim 7 wherein collateral in excess of the amount the central counterparty requires from a counterparty for each of its accepted contracts provides a measure of the counterparty to enter into additional paired contracts without having to provide additional collateral.

68. The credit risk mitigation system for contract transactions between counterparties of claim 37 wherein the termination means further includes a termination of a paired contract between two non-defaulting counterparties upon both non-defaulting counterparties instructing the central counterparty to terminate the paired contract.

\* \* \* \* \*